(12) United States Patent
Tong et al.

(10) Patent No.: US 10,833,741 B2
(45) Date of Patent: *Nov. 10, 2020

(54) COMMUNICATION APPARATUS AND COMMUNICATION METHOD

(71) Applicant: Sun Patent Trust, New York, NY (US)

(72) Inventors: Hui Tong, Beijing (CN); Masayuki Hoshino, Kanagawa (JP); Ming Xu, Beijing (CN); Seigo Nakao, Osaka (JP); Daichi Imamura, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/805,215

(22) Filed: Feb. 28, 2020

(65) Prior Publication Data

US 2020/0204231 A1 Jun. 25, 2020

Related U.S. Application Data

(63) Continuation of application No. 16/164,614, filed on Oct. 18, 2018, now Pat. No. 10,615,857, which is a
(Continued)

(30) Foreign Application Priority Data

Mar. 16, 2010 (CN) .......................... 2010 1 0125169
May 6, 2010 (CN) .......................... 2010 1 0164379

(51) Int. Cl.
*H04B 7/0456* (2017.01)
*H04L 25/03* (2006.01)
(Continued)

(52) U.S. Cl.
CPC ........... *H04B 7/0478* (2013.01); *H04B 7/024* (2013.01); *H04B 7/0456* (2013.01);
(Continued)

(58) Field of Classification Search
CPC .. H04B 7/0478; H04B 7/0634; H04B 7/0456; H04B 7/024; H04B 7/0663;
(Continued)

(56) References Cited

U.S. PATENT DOCUMENTS 8,238,461 B2 8/2012 Zhou et al.
8,259,824 B2 9/2012 Varadarajan et al.
(Continued)

FOREIGN PATENT DOCUMENTS

CN 101345530 A 1/2009
CN 101611569 A 12/2009
(Continued)

OTHER PUBLICATIONS

CATT, "Feedback mechanisms for LTA-A downlink transmission," R1-094145, Agenda Item: 7.5, 3GPP TSG RAN WG1 Meeting #58bis, Miyazaki, Japan, Oct. 12-16, 2009, 4 pages.
(Continued)

*Primary Examiner* — Vineeta S Panwalkar
(74) *Attorney, Agent, or Firm* — Seed IP Law Group LLP

(57) ABSTRACT

The present disclosure provides a method of generating codebook in a wireless communication system with multiple antenna arrays, as well as a wireless communication system, base station and terminal using the codebook for communication. The method comprises steps of: providing a basic codebook which contains multiple pre-coding matrices; and assigning phase offsets to certain pre-coding matrices in the basic codebook to form a codebook with phase offset. The feedback overhead from a client to a base station side is reduced and a good precision of feedback for multi-antenna array is kept by applying the method of generating codebook and using the generated codebook in the wireless communication system, base station and terminal.

10 Claims, 7 Drawing Sheets

Related U.S. Application Data continuation of application No. 15/724,111, filed on Oct. 3, 2017, now Pat. No. 10,148,328, which is a continuation of application No. 15/426,939, filed on Feb. 7, 2017, now Pat. No. 9,813,128, which is a continuation of application No. 14/615,359, filed on Feb. 5, 2015, now Pat. No. 9,602,179, which is a continuation of application No. 14/316,634, filed on Jun. 26, 2014, now Pat. No. 8,995,557, which is a continuation of application No. 13/634,210, filed as application No. PCT/CN2011/071812 on Mar. 15, 2011, now Pat. No. 8,798,195.

(51) Int. Cl.

| | |
|---|---|
| *H04B 7/06* | (2006.01) |
| *H04B 7/024* | (2017.01) |
| *H04B 1/3827* | (2015.01) |
| *H04W 88/02* | (2009.01) |
| *H04W 88/08* | (2009.01) |

(52) U.S. Cl.
CPC ......... *H04B 7/0634* (2013.01); *H04B 7/0639* (2013.01); *H04B 7/0641* (2013.01); *H04B 7/0663* (2013.01); *H04L 25/03904* (2013.01); *H04L 25/03917* (2013.01); *H04B 7/0469* (2013.01); *H04B 2001/3855* (2013.01); *H04B 2001/3861* (2013.01); *H04W 88/02* (2013.01); *H04W 88/08* (2013.01)

(58) Field of Classification Search
CPC .. H04B 7/0641; H04B 7/0639; H04B 7/0469; H04B 2001/3861; H04B 2001/3855; H04L 25/03904; H04L 25/03917; H04W 88/08; H04W 88/02
See application file for complete search history.

(56) References Cited

U.S. PATENT DOCUMENTS

| | | | |
|---|---|---|---|
| 8,325,839 B2 | 12/2012 | Rensburg et al. | |
| 8,582,680 B2 | 11/2013 | Ihm et al. | |
| 8,798,195 B2 | 8/2014 | Tong et al. | |
| 8,995,557 B2 | 3/2015 | Tong et al. | |
| 9,602,179 B2 | 3/2017 | Tong et al. | |
| 9,813,128 B2 | 11/2017 | Tong et al. | |
| 2008/0198946 A1 | 8/2008 | Lee et al. | |
| 2009/0074076 A1 | 3/2009 | Li et al. | |
| 2010/0014608 A1 | 1/2010 | Lee et al. | |
| 2010/0061482 A1 | 3/2010 | Lee et al. | |
| 2011/0103493 A1 | 5/2011 | Xia et al. | |
| 2011/0142166 A1 | 6/2011 | Kim et al. | |
| 2011/0310994 A1* | 12/2011 | Ko ................. | H04B 7/0639 375/295 |
| 2012/0063494 A1* | 3/2012 | Frenne ............ | H04B 7/0417 375/219 |

FOREIGN PATENT DOCUMENTS

| | | |
|---|---|---|
| WO | 2008/054178 A2 | 5/2008 |
| WO | 2008/086239 A1 | 7/2008 |
| WO | 2010/024543 A2 | 3/2010 |

OTHER PUBLICATIONS

CATT, "Codebook design for 8Tx DL MIMO," R1-100022, 3GPP TSG RAN WG1 meeting #59b, Valencia, Spain, Jan. 18-22, 2010, 7 pages.
CATT, "Codebook design for 8Tx DL MIMO," R1-100890, Agenda Item: 7.2.4.4, 3GPP TSG RAN WG1 Meeting #60, San Francisco, USA, Feb. 22-26, 2010, 10 pages.
Executed European Search Report, dated Jun. 28, 2017, for corresponding European Application No. 11755661.3-1874 / 2548315, 9 pages.
Huawei, "Downlink 8TX codebook," R1-101066, 3GPP TSG RAN WG1 #60, Agenda Item: 7.2.4.4, San Francisco, USA, Feb. 22-26, 2010, 11 pages.
International Search Report, dated Jun. 2, 2011, for International Application No. PCT/CN2011/071812, 3 pages.
Motorola, "DL Codebook Design for 8 TX Antennas for LTE-A," R1-091330, 3GPP TSG RAN1#56-BIS, Agenda Item: 15.6, Seoul, Korea, Mar. 2-27, 2009, 4 pages.
Panasonic, "8Tx Codebook Design," R1-102037, 3GPP TSG RAN WG1 Meeting #60bis, Agenda Item: 6.3.4.1 8Tx Codebook design, Beijing, China, Apr. 12-16, 2010, 7 pages.
Philips, "Reuse of Release 8 codebook design for Release 10 DL MIMO UE feedback," R1-101289, 3GPP TSG RAN WG1 Meeting #60, San Francisco, California, Feb. 22-26, 2010, 6 pages.

* cited by examiner

COMMUNICATION APPARATUS AND COMMUNICATION METHOD

BACKGROUND

Technical Field

The present disclosure generally relates to the field of communication, and especially to a method, a base station and a terminal for generating codebook as well as a wireless communication system comprising the base station and the terminal using the generated codebook.

Description of the Related Art

The multi-antenna technology is an important component of the fourth generation wireless communication system. An important application in the multi-antenna technology is closed-loop downlink pre-coding. In this application, when signals are sent to a client by multiple antennas located in a base station, the client measures a downlink transmission channel from the base station to the client, and suggests a corresponding pre-coding matrix to the base station according to the channel condition. This suggestion is transmitted to the base station via a feedback link. Subsequently, in the downlink transmission, the base station may adopt directly the suggested pre-coding matrix to pre-code the signal to be sent to the client.

In the above procedure for closed-loop downlink pre-coding, an important issue is how to feed back the pre-coding matrix suggested by the client. The means which is most popular and possibly most practical is a manner of codebook based feedback. In such a feedback manner, a codebook containing multiple pre-coding matrices is first defined and is applied at both the base station and the client. In this way, when suggesting a certain pre-coding matrix in the codebook to the base station according to the channel condition, the client can feed back the index corresponding to the pre-coding matrix to the base station. For instance, a codebook containing four pre-coding matrices, each of which is indexed respectively as {00}, {01}, {10} and {11}, is known at both the base station and the client. If the client suggests using the first pre-coding matrix, the bits {00} are fed back to the base station. A feedback manner based on the pre-coding matrix index can achieve improvement in both reducing the feedback overhead and assuring a high downlink throughput.

A basic codebook design is based on feedback of a pre-coding matrix for a single antenna array. However, in the current LTE-A (Long Term Evolution-Advanced) standardization, a client may receive signals from multiple antenna arrays located in multiple base stations, for example, in downlink CoMP (Coordinate Multiple Points) as shown in FIG. 1. In such a case, a suggested pre-coding matrix needs to be fed back for each antenna array, and thus multiple pre-coding matrices need to be fed back for the multiple antenna arrays. In addition, in order to enable signals from the multiple antenna arrays be combined coherently at the client, the phase offsets between the pre-coding matrices need to be fed back to the base station as well.

With respect to the feedback manner of the pre-coding matrices under the above downlink CoMP environment, for simplification, as an example, assuming that the base station 1 and the base station 2 are involved in the downlink transmission, and each of the base stations uses an antenna array containing two antennas for transmitting signals (as shown FIG. 2), the description of a currently known feedback manner is made in the following.

For the downlink CoMP environment as shown in FIG. 2, a manner of direct feedback at present is to use a two-antenna codebook defined in LTE standard Rel-8 version for both the base station 1 and the base station 2, i.e., $$\begin{bmatrix} 1 & 1 & 1 & 1 \\ 1 & -1 & j & -1 \end{bmatrix} / \sqrt{2}.$$

There are four pre-coding matrices $$\begin{bmatrix} 1 \\ 1 \end{bmatrix}, \begin{bmatrix} 1 \\ -1 \end{bmatrix}, \begin{bmatrix} 1 \\ j \end{bmatrix} \text{ and } \begin{bmatrix} 1 \\ -j \end{bmatrix}$$

included in the two-antenna codebook. Therefore, when the client performs feedback, two bits are used to feed back PMI1 (Pre-coding Matrix Index) suggested to be employed for the antenna array located in the base station 1, and two bits are used to feed back PMI2 suggested to be employed for the antenna array located in the base station 2 as well. Furthermore, one bit is additionally required to feed back the phase offset (−1 or 1) between the PMI1 and the PMI2 to the base station.

In the above feedback manner, five bits in total are used for feedback. In some cases, however, people may expect to reduce the feedback overhead. In such cases, two possible feedback manners are known as follows.

The first possible manner is substantially the same as the above five-bit feedback manner, and the difference is that the one bit for feeding back the phase offset between the PMI1 and the PMI2 is removed, that is, the phase offset is not fed back. In this way, only four bits in total are needed for feedback. However, since the phase offset is not fed back, the signals transmitted from the antenna arrays of the base stations 1 and 2 may not be combined coherently at the client, thus resulting in the reduction of the system throughput.

Another possible manner is to reduce the number of bits for a pre-coding matrix index (for example, PMI2) from two bits to one bit, and meanwhile one bit is still used to feed back the phase offset. Specifically, the two-antenna codebook defined in the LTE standard Rel-8 version, that is $$\begin{bmatrix} 1 & 1 & 1 & 1 \\ 1 & -1 & j & -j \end{bmatrix} / \sqrt{2},$$

is still used for the base station 1, while a two-antenna codebook containing two pre-coding matrices $$\begin{bmatrix} 1 & 1 \\ 1 & -1 \end{bmatrix} / \sqrt{2}$$

is used for the base station 2. In this way, when the client is feeding back, two bits are still required to feed back the PMI1 for the antenna array located in the base station 1, while only one bit is required to feed back the PMI2 for the antenna array located in the base station 2. In addition, one bit is used to feed back the phase offset between the PMI1 and the PMI2 to the base stations. Thereby, the feedback overhead is reduced to four bits. However, the method results in reduction of the spatial granularity of the codebook of the PMI2, and may also cause reduction of the throughput.

Thus, it has become an issue of the art how to reduce the feedback overhead while keeping the precision of feedback for a multi-antenna array.

BRIEF SUMMARY

In order to address the above issues, the present disclosure provides a method of generating codebook in a wireless communication system, a wireless communication system, a base station, and a wireless terminal by using the method.

In the present disclosure, in order to show relationships between respective elements of codebook more distinctly, the respective elements of codebook may be also represented by their corresponding phases, and enable the amplitudes of all elements to be "1".

According to one aspect of the present disclosure, there is provided a method of generating codebook in a wireless communication system with a plurality of antenna arrays, comprising steps of: providing a basic codebook which contains a plurality of pre-coding matrices; and assigning phase offsets to certain pre-coding matrices in the basic codebook to form a codebook with phase offset.

According to another aspect of the present disclosure, there is provided a wireless communication system by using a plurality of codebooks for communication, the wireless communication system including a plurality of base stations and a terminal performing downlink CoMP (Coordinate Multiple Points) transmission, each of the plurality of base stations being configured with one antenna array, and a plurality of antenna arrays configured in the plurality of base stations respectively corresponding to the plurality of codebooks. The base station comprises: a feedback information reception unit for receiving information fed back from the terminal; a codebook conservation unit for forming a codebook with phase offset by assigning phase offsets to certain pre-coding matrices in a basic codebook, or for storing the basic codebook and the codebook with phase offset in advance; and a sender unit for pre-coding data to be transmitted, and sending the pre-coded data to the terminal via the antenna array configured in the base station. The terminal comprises: a codebook conservation unit for forming a codebook with phase offset by assigning phase offsets to certain pre-coding matrices in a basic codebook, or for storing the basic codebook and the codebook with phase offset in advance; and an information feedback unit for feeding back indexes identifying the pre-coding matrices in the basic codebook and the codebook with phase offset to the plurality of antenna arrays in the plurality of base stations.

According to a further aspect of the present disclosure, there is provided a base station performing downlink CoMP transmission, comprising: a feedback information reception unit for receiving information fed back from a terminal; a codebook conservation unit for forming a codebook with phase offset by assigning phase offsets to certain pre-coding matrices in a basic codebook, or for storing the basic codebook and the codebook with phase offset in advance; and a sender unit for pre-coding data to be transmitted, and sending the pre-coded data to the terminal via the antenna array of the base station.

In the above base station and the wireless communication system according to the present disclosure, the antenna arrays in each of base stations performing downlink CoMP transmission contain the same number of antennas, and a first antenna array located in a first base station uses the basic codebook, while other antenna arrays located in other base stations use the codebook with phase offset.

In the above base station and the wireless communication system according to the present disclosure, each of the antenna arrays contains two antennas, and the basic codebook is a two-antenna codebook defined in the LTE standard Rel-8 version.

In the above base station and the wireless communication system according to the present disclosure, each of the antenna arrays contains four antennas, and the basic codebook is a four-antenna codebook defined in the LTE standard Rel-8 version.

In the above base station and the wireless communication system according to the present disclosure, a first antenna array in a first base station of the multiple base stations performing downlink CoMP transmission contains two antennas, while other antenna arrays in other base stations all contain four antennas. The basic codebook is a four-antenna codebook defined in the LTE standard Rel-8 version, and the codebook with phase offset is used for the other antenna arrays, while a two-antenna codebook defined in the LTE standard Rel-8 version is used for the first antenna array.

In the above base station and the wireless communication system according to the present disclosure, a first antenna array in a first base station of the multiple base stations performing downlink CoMP transmission contains four antennas, while other antenna arrays in other base stations each contain two antennas. The basic codebook is a two-antenna codebook defined in the LTE standard Rel-8 version, and wherein the codebook with phase offset is used for the other antenna arrays, while a four-antenna codebook defined in the LTE standard Rel-8 version is used for the first antenna array.

In the above base station and the wireless communication system according to the present disclosure, the basic codebook is a Discrete Fourier Transform based three-bit four-antenna codebook:

$$\left\{\begin{matrix} 0 & 0 & 0 & 0 & 0 & 0 & 0 & 0 \\ 0 & 45 & 90 & 135 & 180 & -135 & -90 & -45 \\ 0 & 90 & 180 & -90 & 0 & 90 & -180 & -90 \\ 0 & 135 & 270 & 45 & 180 & -45 & -270 & -135 \end{matrix}\right\},$$

and the codebook with phase offset is $$\left\{\begin{matrix} 0 & 180 & 0 & 180 & 0 & 180 & 0 & 180 \\ 0 & -135 & 90 & -45 & 180 & 45 & -90 & 135 \\ 0 & -90 & 180 & 90 & 0 & -90 & -180 & 90 \\ 0 & -45 & 270 & -135 & 180 & 135 & -270 & 45 \end{matrix}\right\}.$$

In the above base station according to the present disclosure, the basic codebook is a four-antenna codebook defined in the LTE standard Rel-8 version:

$$\begin{bmatrix} 0 & 0 & 0 & 0 & 0 & 0 & 0 & 0 & 0 & 0 & 0 & 0 & 0 & 0 & 0 & 0 \\ 0 & 90 & 180 & -90 & 45 & 135 & -135 & -45 & 0 & 90 & 180 & -90 & 0 & 0 & 180 & 180 \\ 0 & 180 & 0 & 180 & 90 & -90 & 90 & -90 & 180 & 0 & 180 & 0 & 0 & 180 & 0 & 180 \\ 0 & -90 & 180 & 90 & 135 & 45 & -45 & -135 & 180 & 90 & 0 & -90 & 180 & 0 & 0 & 180 \end{bmatrix},$$

and the codebook which phase offset is $$\begin{bmatrix} 0 & 0 & 0 & 0 & 180 & 180 & 180 & 180 & 0 & 0 & 0 & 0 & 180 & 180 & 180 & 180 \\ 0 & 90 & 180 & -90 & -135 & -45 & 45 & 135 & 0 & 90 & 180 & -90 & 180 & 180 & 0 & 0 \\ 0 & 180 & 0 & 180 & -90 & 90 & -90 & 90 & 180 & 0 & 180 & 0 & 180 & 0 & 180 & 0 \\ 0 & -90 & 180 & 90 & -45 & -135 & 135 & 45 & 180 & 90 & 0 & -90 & 0 & 180 & 180 & 0 \end{bmatrix}.$$

According to a further aspect of the present disclosure, there is provided a wireless communication system by using a codebook for communication, the wireless communication system including a base station and a terminal, the base station being configured with two antenna arrays. The base station comprises: a feedback information reception unit for receiving information fed back from the terminal; a codebook conservation unit for forming a codebook with phase offset by assigning phase offsets to certain pre-coding matrices in a basic codebook, or for storing a codebook obtained by combination of the basic codebook and the codebook with phase offset in advance, wherein the two antenna arrays correspond to the basic codebook and the codebook with phase offset respectively; and a sender unit for pre-coding data to be transmitted, and sending the pre-coded data to the terminal via the antenna arrays. The terminal comprises: a codebook conservation unit for forming a codebook with phase offset by assigning phase offsets to certain pre-coding matrices in a basic codebook, or for storing the basic codebook and the codebook with phase offset in advance; and an information feedback unit for feeding back indexes identifying the pre-coding matrices in the basic codebook and the codebook with phase offset to the antenna arrays in the base station.

According to a further aspect of the present disclosure, there is provided a base station by using a codebook for communication, the base station being configured with two antenna arrays, the base station comprising: a feedback information reception unit for receiving information fed back from a terminal; a codebook conservation unit for forming a codebook with phase offset by assigning phase offsets to certain pre-coding matrices in a basic codebook, or for storing a codebook obtained by combination of the basic codebook and the codebook with phase offset in advance, wherein the two antenna arrays correspond to the basic codebook and the codebook with phase offset respectively; and a sender unit for pre-coding data to be transmitted, and sending the pre-coded data to the terminal via the antenna arrays.

In the above base station according to the present disclosure, the basic codebook is a Discrete Fourier Transform based three-bit four-antenna codebook:

$$\begin{bmatrix} 0 & 0 & 0 & 0 & 0 & 0 & 0 & 0 \\ 0 & 45 & 90 & 135 & 180 & -135 & -90 & -45 \\ 0 & 90 & 180 & -90 & 0 & 90 & -180 & -90 \\ 0 & 135 & 270 & 45 & 180 & -45 & -270 & -135 \end{bmatrix},$$

and the codebook with phase offset is $$\begin{bmatrix} 0 & 180 & 0 & 180 & 0 & 180 & 0 & 180 \\ 0 & -135 & 90 & -45 & 180 & 45 & -90 & 135 \\ 0 & -90 & 180 & 90 & 0 & -90 & -180 & 90 \\ 0 & -45 & 270 & -135 & 180 & 135 & -270 & 45 \end{bmatrix}.$$

In the above base station according to the present disclosure, the basic codebook is a four-antenna codebook defined in the LTE standard Rel-8 version:

$$\begin{bmatrix} 0 & 0 & 0 & 0 & 0 & 0 & 0 & 0 & 0 & 0 & 0 & 0 & 0 & 0 & 0 & 0 \\ 0 & 90 & 180 & -90 & 45 & 135 & -135 & -45 & 0 & 90 & 180 & -90 & 0 & 0 & 180 & 180 \\ 0 & 180 & 0 & 180 & 90 & -90 & 90 & -90 & 180 & 0 & 180 & 0 & 0 & 180 & 0 & 180 \\ 0 & -90 & 180 & 90 & 135 & 45 & -45 & -135 & 180 & 90 & 0 & -90 & 180 & 0 & 0 & 180 \end{bmatrix},$$

and the codebook which phase offset is $$\begin{bmatrix} 0 & 0 & 0 & 0 & 180 & 180 & 180 & 180 & 0 & 0 & 0 & 0 & 180 & 180 & 180 & 180 \\ 0 & 90 & 180 & -90 & -135 & -45 & 45 & 135 & 0 & 90 & 180 & -90 & 180 & 180 & 0 & 0 \\ 0 & 180 & 0 & 180 & -90 & 90 & -90 & 90 & 180 & 0 & 180 & 0 & 180 & 0 & 180 & 0 \\ 0 & -90 & 180 & 90 & -45 & -135 & 135 & 45 & 180 & 90 & 0 & -90 & 0 & 180 & 180 & 0 \end{bmatrix}.$$

According to a further aspect of the present disclosure, there is provided a wireless terminal, comprising: a codebook conservation unit for forming a codebook with phase offset by assigning phase offsets to certain pre-coding matrices in a basic codebook, or for storing the basic codebook and the codebook with phase offset in advance; and an information feedback unit for feeding back indexes identifying the pre-coding matrices in the basic codebook and the codebook with phase offset to at least one base station.

In the above wireless terminal according to the present disclosure, the basic codebook is a two-antenna codebook defined in the LTE standard Rel-8 version.

In the above wireless terminal according to the present disclosure, the basic codebook is a four-antenna codebook defined in the LTE standard Rel-8 version.

In the above wireless terminal according to the present disclosure, the antenna arrays in each of base stations performing downlink CoMP transmission contain the same number of antennas, and a first antenna array located in a first base station uses the basic codebook, while other antenna arrays located in other base stations use the codebook with phase offset.

In the above wireless terminal according to the present disclosure, each of the antenna arrays contains two antennas, and the basic codebook is a two-antenna codebook defined in the LTE standard Rel-8 version.

In the above wireless terminal according to the present disclosure, each of the antenna arrays contains four antennas, and the basic codebook is a four-antenna codebook defined in the LTE standard Rel-8 version.

In the above wireless terminal according to the present disclosure, a first antenna array in a first base station of the multiple base stations performing downlink CoMP transmission contains two antennas, while other antenna arrays in other base stations all contain four antennas. The basic codebook is a four-antenna codebook defined in the LTE standard Rel-8 version, and the codebook with phase offset is used for the other antenna arrays, while a two-antenna codebook defined in the LTE standard Rel-8 version is used for the first antenna array.

In the above wireless terminal according to the present disclosure, a first antenna array in a first base station of the multiple base stations performing downlink CoMP transmission contains four antennas, while other antenna arrays in other base stations each contain two antennas. The basic codebook is a two-antenna codebook defined in the LTE standard Rel-8 version, and wherein the codebook with phase offset is used for the other antenna arrays, while a four-antenna codebook defined in the LTE standard Rel-8 version is used for the first antenna array.

In the above wireless terminal according to the present disclosure, the basic codebook is a four-antenna codebook defined in the LTE standard Rel-8 version, wherein respective base stations of the base station side are all configured with one antenna array, and the information feedback unit feeds back an index identifying a pre-coding matrix in a two-antenna codebook defined in the LTE standard Rel-8 version to a first antenna array in a first base station of the base station side, and feeds back indexes identifying the pre-coding matrices in the codebook with phase offset to other antenna arrays in other base stations other than the first base station of the base station side.

In the above wireless terminal according to the present disclosure, the basic codebook is a two-antenna codebook defined in the LTE standard Rel-8 version, wherein respective base stations of the base station side are all configured with one antenna array, and the information feedback unit feeds back an index identifying a pre-coding matrix in a four-antenna codebook defined in the LTE standard Rel-8 version to a first antenna array in a first base station of the base station side, and feeds back indexes identifying the pre-coding matrices in the codebook with phase offset to other antenna arrays in other base stations other than the first base station of the base station side.

In the above wireless terminal according to the present disclosure, the basic codebook is a Discrete Fourier Transform based three-bit four-antenna codebook:

$$\begin{bmatrix} 0 & 0 & 0 & 0 & 0 & 0 & 0 & 0 \\ 0 & 45 & 90 & 135 & 180 & -135 & -90 & -45 \\ 0 & 90 & 180 & -90 & 0 & 90 & -180 & -90 \\ 0 & 135 & 270 & 45 & 180 & -45 & -270 & -135 \end{bmatrix},$$

and the codebook with phase offset is $$\begin{bmatrix} 0 & 180 & 0 & 180 & 0 & 180 & 0 & 180 \\ 0 & -135 & 90 & -45 & 180 & 45 & -90 & 135 \\ 0 & -90 & 180 & 90 & 0 & -90 & -180 & 90 \\ 0 & -45 & 270 & -135 & 180 & 135 & -270 & 45 \end{bmatrix}.$$

In the above wireless terminal according to the present disclosure, the basic codebook is a four-antenna codebook defined in the LTE standard Rel-8 version:

$$\begin{bmatrix} 0 & 0 & 0 & 0 & 0 & 0 & 0 & 0 & 0 & 0 & 0 & 0 & 0 & 0 & 0 & 0 \\ 0 & 90 & 180 & -90 & 45 & 135 & -135 & -45 & 0 & 90 & 180 & -90 & 0 & 0 & 180 & 180 \\ 0 & 180 & 0 & 180 & 90 & -90 & 90 & -90 & 180 & 0 & 180 & 0 & 0 & 180 & 0 & 180 \\ 0 & -90 & 180 & 90 & 135 & 45 & -45 & -135 & 180 & 90 & 0 & -90 & 180 & 0 & 0 & 180 \end{bmatrix},$$

and the codebook which phase offset is $$\begin{bmatrix} 0 & 0 & 0 & 0 & 180 & 180 & 180 & 180 & 0 & 0 & 0 & 0 & 180 & 180 & 180 & 180 \\ 0 & 90 & 180 & -90 & -135 & -45 & 45 & 135 & 0 & 90 & 180 & -90 & 180 & 180 & 0 & 0 \\ 0 & 180 & 0 & 180 & -90 & 90 & -90 & 90 & 180 & 0 & 180 & 0 & 180 & 0 & 180 & 0 \\ 0 & -90 & 180 & 90 & -45 & -135 & 135 & 45 & 180 & 90 & 0 & -90 & 0 & 180 & 180 & 0 \end{bmatrix}.$$

According to a further aspect of the present disclosure, there is provided a method of generating codebook in a wireless communication system with a plurality of antenna arrays, comprising steps of: providing a basic codebook which contains two sets of base vectors, respective base vectors of each set of base vectors being orthogonal with each other; acquiring vectors being orthogonal with at least one base vector in a second set of base vectors; making a vector whose correlation with one base vector of a first set of base vectors is the highest among the acquired vectors be a new base vector; generating other new base vectors; and replacing the base vectors with the new base vectors respectively to form a new basic codebook.

According to a further another aspect of the present disclosure, there is provided a method of generating a codebook in a wireless communication system, the method comprising: a setting step of setting a basic codebook comprising a plurality of base vectors which are grouped into a plurality of sets, respective base vectors in each set of base vectors being orthogonal with each other; a computation step of computing a new base vector corresponding to one base vector in one set of the plurality of sets of base vectors, so that the new base vector equals to another base vector in other sets of base vectors other than the one set of base vectors, and repeating the computation step to acquire a plurality of new base vectors corresponding to the plurality of base vectors; and a generation step of generating a new basic codebook using the respective new base vectors.

In the above method according to the present disclosure, the plurality of base vectors in the basic codebook are $w_m$, which are DFT vectors, and differences between directions of base vectors $w_m$ and $w_{m+n}$ are n times of 11.25° in turn, where m and n are integer numbers in following embodiments and claims, although they are also possible to be real numbers.

In the above method according to the present disclosure, the obtained new base vectors are $w'_m$. $w'_m$ is also DFT vectors but the directions of which are different from the corresponding base vectors $w_m$. Wherein $w'_m = w_{m+n}$, for example, it is possible to have $w'_m = w_{m+1}$, or $w'_m = w_{m+2}$, or $w'_m = w_{m+3}$, etc.

In the above method according to the present disclosure, the form of a rank 2 pre-coding vector in the new basic codebook is $$\begin{bmatrix} w_m & w'_m \\ w_m & -w'_m \end{bmatrix} \text{ and/or } \begin{bmatrix} w_m & w'_m \\ jw_m & -jw'_m \end{bmatrix},$$

wherein $$\begin{bmatrix} w_m \\ w_m \end{bmatrix} \text{ and } \begin{bmatrix} w'_m \\ -w'_m \end{bmatrix}$$

are used to precode the signals in different layers sent from a base station respectively, and $$\begin{bmatrix} w_m \\ jw_m \end{bmatrix} \text{ and } \begin{bmatrix} w'_m \\ -jw'_m \end{bmatrix}$$

are used to precode the signals in different layers sent from the base station respectively.

According to a further another aspect of the present disclosure, there is provided a base station for performing communication using a codebook, the base station comprising: a feedback information reception unit for receiving information fed back from a terminal; a codebook conservation unit for saving a basic codebook and/or a new basic codebook, the basic codebook comprising a plurality of base vectors which are grouped into a plurality of sets, respective base vectors in each set of base vectors being orthogonal with each other, the new basic codebook being obtained in a way of: computating a new base vector corresponding to one base vector in one set of the plurality of sets of base vectors, so that the new base vector equals to another base vector in other sets of base vectors other than the one set of base vectors, and repeating the above operation to acquire a plurality of new base vectors corresponding to the plurality of base vectors, and generating the new basic codebook using the respective new base vectors; and a sender unit for pre-coding data to be transmitted by using the basic codebook and/or the new basic codebook based on the information fed back from the terminal, and sending the pre-coded data to the terminal via an antenna array.

In the above base station according to the present disclosure, the plurality of base vectors in the basic codebook are $w_m$, which are DFT vectors, and differences between directions of base vectors $w_m$ and $w_{m+n}$ are n times of 11.25° in turn, where m and n are integer numbers in following embodiments and claims, although they are also possible to be real numbers.

In the above base station according to the present disclosure, the obtained new base vectors are $w'_m$. $w'_m$ is also DFT vectors but the directions of which are different from the corresponding base vectors $w_m$. Wherein $w'_m=w_{m+n}$, for example, it is possible to have $w'_m=w_{m+1}$, or $w'_m=w_{m+2}$, or $w'_m=w_{m+3}$, etc.

In the above base station according to the present disclosure, the form of a rank 2 pre-coding vector in the new basic codebook is $$\begin{bmatrix} w_m & w'_m \\ w_m & -w'_m \end{bmatrix} \text{ and/or } \begin{bmatrix} w_m & w'_m \\ jw_m & -jw'_m \end{bmatrix},$$

wherein $$\begin{bmatrix} w_m \\ w_m \end{bmatrix} \text{ and } \begin{bmatrix} w'_m \\ -w'_m \end{bmatrix}$$

are used to precode the signals in different layers sent from a base station respectively, $$\begin{bmatrix} w_m \\ jw_m \end{bmatrix} \text{ and } \begin{bmatrix} w'_m \\ jw'_m \end{bmatrix}$$

are used to precode the signals in different layers sent from the base station respectively.

According to a further another aspect of the present disclosure, there is provided a terminal for performing communication using a codebook, the terminal comprising: a codebook conservation unit for saving a basic codebook and/or a new basic codebook, the basic codebook comprising a plurality of base vectors which are grouped into a plurality of sets, respective base vectors in each set of base vectors being orthogonal with each other, the new basic codebook being obtained in a way of: computating a new base vector corresponding to one base vector in one set of the plurality of sets of base vectors, so that the new base vector equals to another base vector in other sets of base vectors other than the one set of base vectors, and repeating the above operation to acquire a plurality of new base vectors corresponding to the plurality of base vectors, and generating the new basic codebook using the respective new base vectors; and a information feedback unit for feeding back indexes identifying pre-coding matrixes in the basic codebook and/or the new basic codebook to a base station.

In the above terminal according to the present disclosure, the plurality of base vectors in the basic codebook are $w_m$, which are DFT vectors, and differences between directions of base vectors $w_m$ and $w_{m+n}$ are n times of 11.25° in turn, where m and n are integer numbers in following embodiments and claims, although they are also possible to be real numbers.

In the above terminal according to the present disclosure, the obtained new base vectors are $w'_m$. $w'_m$ is also DFT vectors but the directions of which are different from the corresponding base vectors $w_m$. Wherein $w'_m=w_{m+n}$, for example, it is possible to have $w'_m=w_{m+1}$, or $w'_m=w_{m+2}$, or $w'_m=w_{m+3}$, etc.

In the above terminal according to the present disclosure, the form of a rank 2 pre-coding vector in the new basic codebook is $$\begin{bmatrix} w_m & w'_m \\ w_m & -w'_m \end{bmatrix} \text{ and/or } \begin{bmatrix} w_m & w'_m \\ jw_m & -jw'_m \end{bmatrix},$$

wherein $$\begin{bmatrix} w_m \\ w_m \end{bmatrix} \text{ and } \begin{bmatrix} w'_m \\ -w'_m \end{bmatrix}$$

are used to precode the signals in different layers sent from a base station respectively, and $$\begin{bmatrix} w_m \\ jw_m \end{bmatrix} \text{ and } \begin{bmatrix} w'_m \\ -jw'_m \end{bmatrix}$$

are used to precode the signals in different layers sent from the base station respectively.

By applying the method of generating a codebook with phase offset from a basic codebook provided by the present disclosure, and by using the generated codebook in a wireless communication system, base stations and terminals, the phase offsets between the antenna arrays may be fed back without increasing the size of the codebook, and the spatial granularity of the codebook is not reduced. Therefore, compared to the methods employed in the prior art, the present disclosure can effectively improve the precision of feedback for a multi-antenna array with the same feedback overhead.

BRIEF DESCRIPTION OF THE SEVERAL VIEWS OF THE DRAWINGS

These and/or other aspects and advantages of the present disclosure will become more distinct and easier to be understand from a detailed description of embodiments of the present disclosure in combination with attached drawings below, in which.

DETAILED DESCRIPTION

Figure 1:
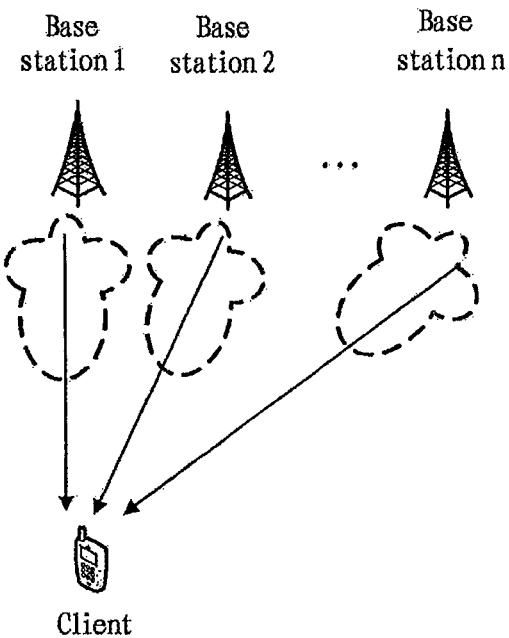
FIG. 1 shows an exemplary systematic framework for downlink CoMP transmission system.

Some specific embodiments of the present disclosure will be described in detail in combination with attached drawings below. If the detailed description of some related prior art may confuse the main points of the disclosure, the detailed description thereof will not be provided here. In respective embodiments, identical reference numerals are used to denote elements or units performing the same functions.

First Embodiment

In the present embodiment, by employing a novel codebook design in which phase offsets and pre-coding matrix indexes are fed back simultaneously, the feedback overhead is reduced and a good precision of feedback for multi-antenna array is kept.

Figure 2:
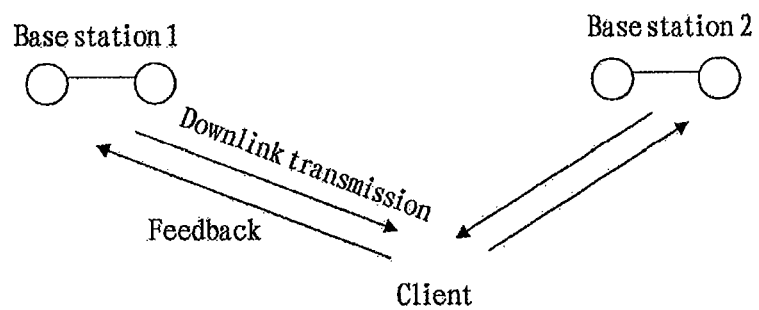
FIG. 2 shows a schematic diagram for applying a codebook generation method of an embodiment of the present disclosure under an environment in which two base stations take part in a collaborative downlink transmission and each of the base stations employs an antenna array containing two antennas to perform signal transmission.

First, a specific implementation provided by the present disclosure with respect to the above five-bit feedback manner, whose performance is the best, is introduced. According to the specific embodiment, for the downlink CoMP environment as shown in FIG. 2, the above two-bit two-antenna codebook of Rel-8, that is $$\begin{bmatrix} 1 & 1 & 1 & 1 \\ 1 & -1 & j & -j \end{bmatrix} / \sqrt{2},$$

is employed for any one of base stations (for example, the base station 1) while a novel three-bit two-antenna codebook with phase offset, i.e., $$\begin{bmatrix} 1 & 1 & 1 & 1 & -1 & -1 & -1 & -1 \\ 1 & -1 & j & -j & -1 & 1 & -j & j \end{bmatrix} / \sqrt{2}$$

is used for the other base station (for example, the base station 2). It can be seen that the three-bit two-antenna codebook is composed of the four pre-coding matrices in the codebook for the base station 1 and four corresponding pre-coding matrices obtained by applying the phase offset of −1 to the four pre-coding matrices. In this way, when the client is feeding back, two bits will be used to feed back the index for the pre-coding matrix suggested to be employed for the antenna array located in the base station 1, while three bits will be used to feed back for the antenna array located in the base station 2. Apparently, in the three-bit feedback, not only the pre-coding matrix suggested to be employed but also the phase offset is fed back.

Firstly it is observed that there are highly correlated pre-coding matrices in the two antenna codebook of LTE Rel-8. For example, the correlation of [1 1] and [1 j] is high, and the correlation of [1 −1] and [1 −j] is high. Moreover it is observed that the correlation of combined pre-coding matrices [1 1 1 1] and [1 1 1 j] of the two base stations is very high when it is assumed that the pre-coding matrix for the antenna array in the base station 1 has been determined to be [1 1]. Thus, if the feedback overhead is required to be reduced, one of [1 1] and [1 j] in the three-bit codebook may be deleted. Similarly, the correlation of combined pre-coding matrices [1 1 −1 −1] and [1 1 −1 −j] of the two base stations is also very high, so that one of [−1 −1] and [−1 −j] in the three-bit codebook may be deleted to reduce the feedback overhead. At last, it is chosen to delete [1 j] and [−1 −1] for the purpose of securing the spatial granularity of codebook for the antenna array of the base station 2. For the same reason, [1 −j] and [−1 1] in the three-bit codebook can be further deleted to reduce the feedback overhead.

Finally, the above three-bit codebook with the phase offset can be simplified as a two-bit codebook $$\begin{bmatrix} 1 & 1 & -1 & -1 \\ 1 & -1 & -j & j \end{bmatrix} / \sqrt{2}.$$

In this way, when the client is feeding back, only two bits are required to feed back for both the base station 1 and the base station 2 respectively, so that the feedback overhead is reduced. On the other hand, since the two-bit codebook for the base station 2 contains the phase offset, the phase offset is reflected in the feedback from the client to the base station, so that signals transmitted from the base station 1 and the base station 2 can be combined coherently at the client.

It is worth mentioning that [1 j], [−1 −1], [1 −j] and [−1 1] are deleted from the three-bit codebook to reduce the feedback overhead in the above procedure. However, it is only one exemplary choice for deletion. For example, for the combined pre-coding matrices [1 1 1 1] and [1 1 1 j] having high correlation, [1 j] is chosen to be deleted among [1 1] and [1 j] in the three-bit codebook in the above example, but actually, it is possible to choose to delete [1 1]. Similarly, for the combined pre-coding matrices [1 1 −1 −1] and [1 1 −1 −j] having high correlation, [−1 −j] may also be deleted among [−1 −1] and [−1 −j] in the three-bit codebook. By such different choices for deletion, different simplified two-bit codebook can be finally obtained from the three-bit codebook. For example, a two-bit codebook $$\begin{bmatrix} -1 & -1 & 1 & 1 \\ -1 & 1 & j & -j \end{bmatrix}/\sqrt{2}$$

is obtained by deleting [1 1], [−1 −j], [1 −1] and [−1 j] from the three-bit codebook. The two-bit codebook may replace the above simplified codebook $$\begin{bmatrix} 1 & 1 & -1 & -1 \\ 1 & -1 & -j & j \end{bmatrix}/\sqrt{2}$$

as the codebook for the antenna array in the base station 2.

A specific procedure for deduction in which a simplified two-bit two-antenna codebook is obtained from a three-bit two-antenna codebook has been described above, on the basis of which the present disclosure summarizes a general method of generating a two-bit two-antenna codebook with phase offset as a target. According to the method, a codebook with phase offset for the antenna array in the base station 2 can be obtained directly from a basic codebook $$\begin{bmatrix} 1 & 1 & -1 & -1 \\ 1 & -1 & -j & j \end{bmatrix}/\sqrt{2}$$

for the antenna array in the base station 1.

Figure 3:
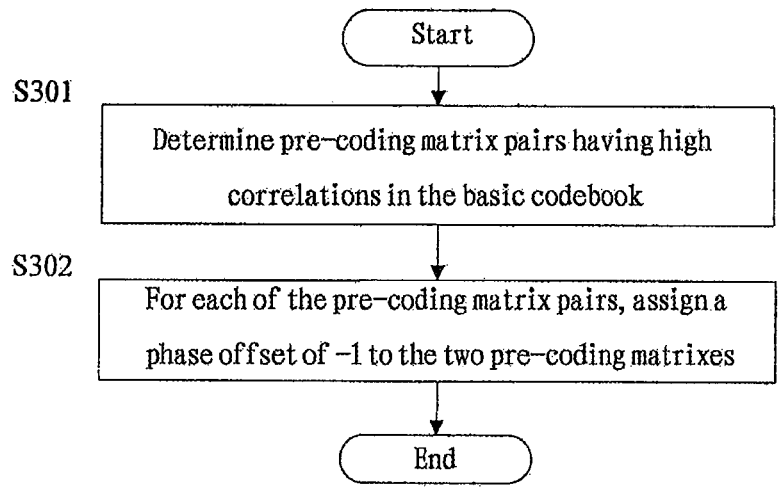
FIG. 3 shows a flow chart of a codebook generation method according to a first embodiment of the present disclosure.

FIG. 3 shows a method of generating a codebook with phase offset from a basic codebook according to the present embodiment. As shown in FIG. 3, at step S301, the pre-coding matrix pairs having high correlations in the basic codebook are determined; and subsequently at step S302, for each one of the pre-coding matrix pairs, a phase offset of −1 is assigned to the two pre-coding matrices therein. Thereby, a codebook with phase offset in which the phase offset and the pre-coding matrix may be fed back simultaneously can be obtained. It should be noted that the meanings and definition of the high correlation as described above is well known for those skilled in the art, and it will not be illustrated in details here any more. According to the method, for the above downlink CoMP environment as shown in FIG. 2, the pre-coding matrix pairs having high correlations, that is [1 1] and [1 j] as well as [1 −1] and [1 −], are firstly determined in the basic codebook $$\begin{bmatrix} 1 & 1 & 1 & 1 \\ 1 & -1 & j & -j \end{bmatrix}/\sqrt{2}$$

for the antenna array in the base station 1. Then, for the pre-coding matrix pair [1 1] and [1 j] therein, a phase offset of −1 is applied to for example [1 j] to obtain [−1 −j]; also, for the pre-coding matrix pair [1 −1] and [1 −j] therein a phase offset of −1 is applied to for example [1 −j] to obtain [−1 j]. Thereby, a new codebook $$\begin{bmatrix} 1 & 1 & -1 & -1 \\ 1 & -1 & -j & j \end{bmatrix}/\sqrt{2}$$

is obtained from the basic codebook, which is a simplified two-bit two-antenna codebook obtained by deleting [1 j], [−1 −1], [1 −j] and [−1 1] from the three-bit codebook as described above.

It is easy to understand that when a phase offset of −1 is assigned to two pre-coding matrices in a pre-coding matrix pair having a high correlation according to the step S302, the phase offset of −1 can be applied to either of the pre-coding matrices. For example, in the above exemplary illustration, for the pre-coding matrix pair [1 1] and [1 j], a phase offset of −1 is applied to [1 j], and practically, the phase offset of −1 may be applied to [1 1] as well and thus [−1 −1] is obtained. Also, for the pre-coding matrix pair [1 −1] and [1 −j], a phase offset of −1 may also be applied to for example [1 −1] to obtain [−1 1]. Thereby, a new codebook $$\begin{bmatrix} -1 & -1 & 1 & 1 \\ -1 & 1 & j & -j \end{bmatrix}/\sqrt{2},$$

that is a simplified two-bit two-antenna codebook obtained by deleting [1 1], [−1 −j], [1 −1] and [−1 j] from the three-bit codebook as described above, is obtained from the basic codebook.

It is worth mentioning that although, for each pre-coding matrix pair, a phase offset of −1 is assigned to the two pre-coding matrices in the step S302 of the above method according to the present embodiment, the assignment of the phase offset of −1 is only one simplest manner of phase offset assignment. In fact, a phase offset may be assigned to two pre-coding matrices included in a pre-coding matrix pair according to whether the correlation of the two pre-coding matrices is high or low. For example, one advantageous generalization is to, for each pre-coding matrix pair, assign a phase offset to the two pre-coding matrices included therein according to whether the correlation of the two pre-coding matrices is high or low, such that the higher the correlation of the two pre-coding matrices in the pre-coding matrix pair is, the larger the assigned phase offset is.

Second Embodiment

In the first embodiment, taking a case in which the base station 1 and the base station 2 take part in a collaborative downlink transmission with each of the base stations employing an antenna array containing two antennas to perform signal transmission as an example, a method of generating codebook according to one example of the present disclosure is described. Also, the present disclosure may be applied to a downlink CoMP environment in which the antenna array of each base station contains other numbers of antennas. For example, in the present embodiment, a method of generating codebook according to another example of the present disclosure is explained by taking a case in which a base station 1 and a base station 2 take part in a collaborative downlink transmission with each of the base stations employing an antenna array containing four antennas to perform signal transmission (as shown in FIG. 4) as an example.

Figure 4:
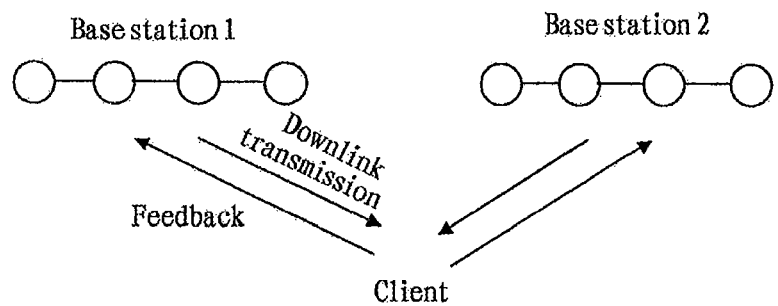
FIG. 4 shows a schematic diagram for applying a codebook generation method of an embodiment of the present disclosure under an environment in which two base stations take part in a collaborative downlink transmission and each of the base stations employs an antenna array containing four antennas to perform signal transmission.

In the downlink CoMP environment as shown in FIG. 4, both of the base station 1 and the base station 2 employ four transmission antennas to perform signal transmission to a client. Therefore, a Rel-8 four-antenna codebook is used for one of the base stations (for example the base station 1), and for the other base station (for example the base station 2), a four-antenna codebook with phase offset is used, which is generated according to the method of generating codebook of the first embodiment of the present disclosure taking the Rel-8 four-antenna codebook as a basic codebook.

The Rel-8 four-antenna codebook is well known for those skilled in the art which contains 16 pre-coding matrices. According to the method of generating codebook of the first embodiment of the present disclosure, the 16 pre-coding matrices in the codebook are grouped into 8 pre-coding matrix pairs having high correlations. Subsequently, a phase offset is assigned to two pre-coding matrices of each of the pre-coding matrix pairs, thereby a codebook with phase offset is obtained. An example of a Rel-8 four-antenna codebook and a codebook with phase offset which is generated from the Rel-8 four-antenna codebook are shown as follows. (in the following, in order to show relationships between respective elements in a codebook more distinctly, the respective elements are represented by their corresponding phases, and amplitudes of all the elements are 1).

The Rel-8 four-antenna codebook is as follows:

$$\begin{bmatrix} 0 & 0 & 0 & 0 & 0 & 0 & 0 & 0 & 0 & 0 & 0 & 0 & 0 & 0 & 0 & 0 \\ 0 & 90 & 180 & -90 & 45 & 135 & -135 & -45 & 0 & 90 & 180 & -90 & 0 & 0 & 180 & 180 \\ 0 & 180 & 0 & 180 & 90 & -90 & 90 & -90 & 180 & 0 & 180 & 0 & 0 & 180 & 0 & 180 \\ 0 & -90 & 180 & 90 & 135 & 45 & -45 & -135 & 180 & 90 & 0 & -90 & 180 & 0 & 0 & 180 \end{bmatrix}$$

By generating 8 pre-coding matrix pairs having high correlations from 16 pre-coding matrices in the codebook in a pairing manner of {1, 5} {2, 6} {3, 7} {4, 8} {9, 13} {10, 14} {11, 15} {12, 16} (respective numbers represent sequence numbers for pre-coding matrices in a codebook) and assigning a phase offset of 180° (i.e., a phase offset of −1) to each of pre-coding matrix pairs, a codebook with phase offset is generated as follows:

$$\begin{bmatrix} 0 & 0 & 0 & 0 & 180 & 180 & 180 & 180 & 0 & 0 & 0 & 0 & 180 & 180 & 180 & 180 \\ 0 & 90 & 180 & -90 & -135 & -45 & 45 & 135 & 0 & 90 & 180 & -90 & 180 & 180 & 0 & 0 \\ 0 & 180 & 0 & 180 & -90 & 90 & -90 & 90 & 180 & 0 & 180 & 0 & 180 & 0 & 180 & 0 \\ 0 & -90 & 180 & 90 & -45 & -135 & 135 & 45 & 180 & 90 & 0 & -90 & 0 & 180 & 180 & 0 \end{bmatrix}$$

It is to be explained that the Rel-8 four-antenna codebook given above is only a possible form, and the codebook may also be composed of other pre-coding matrices as known by those skilled in the art.

On the other hand, the above manner of grouping 16 pre-coding matrices into 8 pre-coding matrix pairs having high correlations is not exclusive, and other pairing manners may be employed according to correlations between respective matrices. In addition, although the phase offset of 180° is assigned to two pre-coding matrices in each of pre-coding matrix pair in the above example, more generally a phase offset may be assigned according to the correlation between the two pre-coding matrices of a pre-coding matrix pair, as mentioned in the first embodiment, such that for example the higher the correlation between the two pre-coding matrices of the pre-coding matrix pair is, the larger the assigned phase offset is.

Third Embodiment

In the above two embodiments, taking the cases in which only two base stations perform collaborative downlink transmissions as examples, methods for codebook generation according to some examples of the present disclosure are described. The present disclosure may also be applied to situations of multiple base stations taking part in CoMP downlink transmission. In the following, a description of a method of generating codebook according to one example of the present disclosure is made by taking a case as shown in FIG. 5 as an example, in which multiple base stations take part in collaborative downlink transmission with each of the base stations employing an antenna array containing two antennas to perform signal transmission.

Figure 5:
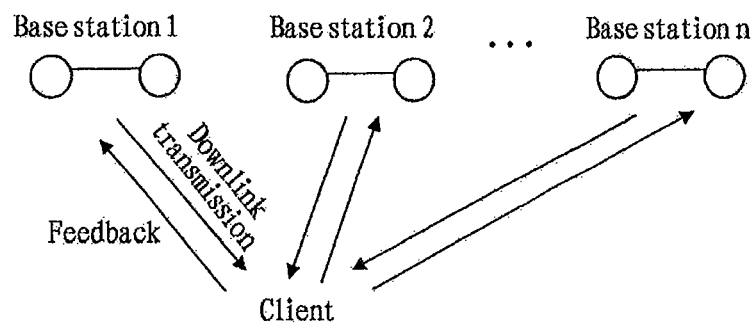
FIG. 5 shows a schematic diagram for applying a codebook generation method of an embodiment of the present disclosure under an environment in which multiple base stations take part in a collaborative downlink transmission and each of the base stations employs an antenna array containing two antennas to perform signal transmission.

In the present embodiment, with respect to the downlink CoMP environment as shown in FIG. 5, a Rel-8 two-bit two-antenna codebook, i.e., $$\begin{bmatrix} 1 & 1 & 1 & 1 \\ 1 & -1 & j & -j \end{bmatrix} \Big/ \sqrt{2},$$

is used for any one of the base stations (for example the base station 1), and a codebook with phase offset which is generated according to the method of generating codebook of the first embodiment of the present disclosure, for example $$\begin{bmatrix} 1 & 1 & -1 & -1 \\ 1 & -1 & -j & j \end{bmatrix} \Big/ \sqrt{2},$$

is used for each of other base stations. It should be understood by those skilled in the art that by applying a codebook with phase offset which is generated according to the method of generating codebook of the first embodiment to each of the base stations other than the base station 1, the phase offsets between the antenna array in each of the other base stations and the antenna array in the base station 1 can be fed back.

It is easy to be understand that although the description is made taking the case in which the antenna array in each of base stations contains two antennas as an example in the present embodiment, the disclosure may also be applied to a downlink CoMP environment where the antenna array in each of base stations contains other numbers of antennas (for example four antennas).

Fourth Embodiment

In the above embodiments, by taking cases in which the antenna array in each of base stations perform collaborative downlink transmissions contains the same number of antennas as examples, the methods for codebook generation according to some examples of the present disclosure are described. The present disclosure may also be applied to situations in which the antenna array in each of base stations contains different number of antennas, which will be described in the present embodiment.

For convenience of description, it is assumed that a certain base station (for example the base station 1) of the multiple base stations as shown in FIG. 5 uses an antenna array containing four antennas for signal transmission, and each of other base stations still uses an antenna array containing two antennas for signal transmission. In such an exemplary case, according to the present embodiment, a Rel-8 four-antenna codebook is used for the base station 1, while a two-antenna codebook with phase offset, which is generated according to the first embodiment of the present disclosure by taking the Rel-8 two-antenna codebook as a basic codebook, is used for each of other base stations. The Rel-8 four-antenna codebook and the two-antenna codebook have been described in the foregoing embodiments, and unnecessary details thereof will not be given herein.

Similarly, it is assumed that a certain base station (for example the base station 1) of the multiple base stations as shown in FIG. 5 still uses an antenna array containing two antennas for signal transmission, and each of other base stations uses an antenna array containing four antennas for signal transmission. In such an exemplary case, according to the present embodiment, a Rel-8 two-antenna codebook is used for the base station 1, while a four-antenna codebook with phase offset, which is generated according to the first embodiment of the present disclosure by taking a Rel-8 four-antenna codebook as a basic codebook, is used for each of other base stations.

Fifth Embodiment

The above embodiments describe methods for codebook generation in CoMP environments according to one aspect of the present disclosure. In fact, the disclosure may also be applied in dual-polarized antennas.

Figure 6:
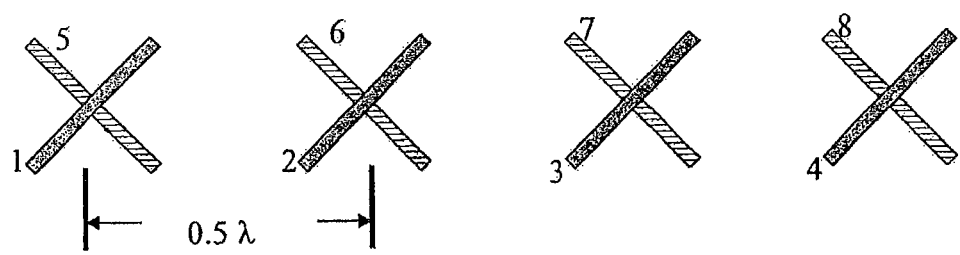
FIG. 6 shows a configuration for eight dual-polarized antennas.

FIG. 6 shows a configuration for eight dual-polarized antennas. As shown in FIG. 6, antennas 1, 2, 3 and 4 have the same polarization feature, that is polarization of positive 45 degree; antennas 5, 6, 7 and 8 have the same polarization feature, that is polarization of negative 45 degree; and antenna pairs of 1 and 5, 2 and 6, 3 and 7, 4 and 8 are respectively at the same physical position. Since spaces between dual-polarized antennas are generally half-wavelength, the antennas 1, 2, 3 and 4 have correlation, and the antennas 5, 6, 7 and 8 have correlation. Meanwhile, the antenna array 1 containing the antennas 1, 2, 3 and 4 and the antenna array 2 containing the antennas 5, 6, 7 and 8 are independent from each other.

It can be seen from the above description that for dual-polarized antennas, the antennas can be considered equivalently as two antenna arrays in a physical model. Therefore, the methods for codebook generation according to the above embodiments of the present disclosure may be applied for the dual-polarized antennas. Specifically speaking, for the dual-polarized antennas, a basic codebook may be applied to the first antenna array containing antennas with a first same polarization feature (for example a polarization of positive 45 degree). Then, a codebook with phase offset is generated by applying the method of generating codebook of the first embodiment of the present disclosure. The codebook with phase offset is used for the second antenna array containing antennas with a second same polarization feature (for example a polarization of negative 45 degree). Finally, the basic codebook for the first antenna array and the generated codebook for the second antenna array are combined into one codebook along the column direction as the codebook for dual-polarized antennas.

It should be explained that the pre-coding matrix index feedback in a case of dual-polarized antennas is different from that in a CoMP case. As described above, under a CoMP environment, certain bits are required to feed back the index for the pre-coding matrix suggested to be employed for the antenna array in each of base stations. For example, in the first embodiment, when the client performs feedback to the base stations, two bits will be used to feed back the index for the pre-coding matrix suggested to be employed by the antenna array in the base station 1, meanwhile, other two bits will be used to feed back the index for the pre-coding matrix suggested to be employed by the antenna array in the base station 2. However, in a case of dual-polarized antennas, the pre-coding matrix indexes for the first antenna array and the second antenna array are highly correlated, thus the pre-coding matrix index for the second antenna array is always the same as the pre-coding matrix index for the first antenna array. That is to say, in this case, only the index for the pre-coding matrix suggested to be used by the first antenna array is needed to be fed back, and there is no need to use redundant bits to feed back the index for the pre-coding matrix suggested to be employed by the second antenna array.

In the following, taking a case in which a DFT (Discrete Fourier Transform) based three-bit four-antenna codebook is used as a basic codebook for the first antenna array as an example, the application of the method of generating codebook according to the first embodiment of the present disclosure in an environment of eight dual-polarized antennas is described.

The DFT based three-bit four-antenna codebook is well known for those skilled in the art, and a possible form thereof represented in phases is $$\begin{bmatrix} 0 & 0 & 0 & 0 & 0 & 0 & 0 & 0 \\ 0 & 45 & 90 & 135 & 180 & -135 & -90 & -45 \\ 0 & 90 & 180 & -90 & 0 & 90 & -180 & -90 \\ 0 & 135 & 270 & 45 & 180 & -45 & -270 & -135 \end{bmatrix}.$$

According to the method of generating codebook in the first embodiment of the present disclosure, the 8 pre-coding matrices in the above codebook are grouped into 4 pre-coding matrix pairs having high correlations, and a phase offset of 180° is assigned to each of the pre-coding matrix pairs, thereby generating a codebook with phase offset for the second antenna array as follows:

$$\begin{bmatrix} 0 & 0+180 & 0 & 0+180 & 0 & 0+180 & 0 & 0+180 \\ 0 & 45+180 & 90 & 135+180 & 180 & -135+180 & -90 & -45+180 \\ 0 & 90+180 & 180 & -90+180 & 0 & 90+180 & -180 & -90+180 \\ 0 & 135+180 & 270 & 45+180 & 180 & -45+180 & -270 & -135+180 \end{bmatrix},$$

after simplification, it is $$\begin{bmatrix} 0 & 180 & 0 & 180 & 0 & 180 & 0 & 180 \\ 0 & -135 & 90 & -45 & 180 & 45 & -90 & 135 \\ 0 & -90 & 180 & 90 & 0 & -90 & -180 & 90 \\ 0 & -45 & 270 & -135 & 180 & 135 & -270 & 45 \end{bmatrix}$$

In this way, by combining the above two codebooks along the column direction, a three-bit codebook for eight dual-polarized antennas as shown below may be obtained.

$$\begin{bmatrix} 0 & 0 & 0 & 0 & 0 & 0 & 0 & 0 \\ 0 & 45 & 90 & 135 & 180 & -135 & -90 & -45 \\ 0 & 90 & 180 & -90 & 0 & 90 & -180 & -90 \\ 0 & 135 & 270 & 45 & 180 & -45 & -270 & -135 \\ 0 & 180 & 0 & 180 & 0 & 180 & 0 & 180 \\ 0 & -135 & 90 & -45 & 180 & 45 & -90 & 135 \\ 0 & -90 & 180 & 90 & 0 & -90 & -180 & 90 \\ 0 & -45 & 270 & -135 & 180 & 135 & -270 & 45 \end{bmatrix}$$

Sixth Embodiment

In the fifth embodiment, both the basic codebook and the generated codebook with phase offset are three-bit codebooks without adding special bits to feed back a phase offset, thereby obtaining a good precision of feedback without increasing the feedback overhead. However, in some cases, people may expect to obtain a more precise feedback precision and can accept increasing of the feedback overhead. In such a case, the above DFT based three-bit four-antenna codebook can be extended into a four-bit codebook in which the added one bit is used for the feedback of a phase offset. The example will be described in the present embodiment.

In the present embodiment, a four-bit codebook obtained by extending the above DFT based three-bit four-antenna codebook, i.e., combining two DFT based three-bit four-antenna codebook in the row direction, is used for the first antenna array:

$$\begin{bmatrix} 0 & 0 & 0 & 0 & 0 & 0 & 0 & 0 & 0 & 0 & 0 & 0 & 0 & 0 & 0 & 0 \\ 0 & 45 & 90 & 135 & 180 & -135 & -90 & -45 & 0 & 45 & 90 & 135 & 180 & -135 & -90 & -45 \\ 0 & 90 & 180 & -90 & 0 & 90 & -180 & -90 & 0 & 90 & 180 & -90 & 0 & 90 & -180 & -90 \\ 0 & 135 & 270 & 45 & 180 & -45 & -270 & -135 & 0 & 135 & 270 & 45 & 180 & -45 & -270 & -135 \end{bmatrix}$$

The 8 pre-coding matrix pairs having high correlations are generated from 16 pre-coding matrices in the codebook in a pairing manner of {1, 2} {3, 4} {5, 6} {7, 8} {9, 10} {11, 12} {13, 14}{15, 16} (respective numbers represent sequence numbers for pre-coding matrices in a codebook), and for each of the pre-coding matrix pairs, a phase offset is assigned to two pre-coding matrices contained therein according to whether the correlation of the two pre-coding matrices is high or low. Specifically, in the present embodiment, for each of the matrix pairs {1, 2} {3, 4} {5, 6} {7, 8}, a phase offset of 0 is assigned to one pre-coding matrix therein, and a phase offset of 90° is assigned to the other pre-coding matrix; for each of the matrix pairs {9, 10} {11, 12} {13, 14} {15, 16}, a phase offset of 180° is assigned to one pre-coding matrix therein, and a phase offset of −90° is assigned to the other pre-coding matrix, the assignment of phase offset is shown as follows:

$$\begin{bmatrix} 0+0 & \begin{matrix}0+\\90\end{matrix} & \begin{matrix}0+\\0\end{matrix} & \begin{matrix}0+\\90\end{matrix} & \begin{matrix}0+\\0\end{matrix} & 0+90 & 0+0 & 0+90 & \begin{matrix}0+\\180\end{matrix} & \begin{matrix}0-\\90\end{matrix} & \begin{matrix}0+\\180\end{matrix} & 0-90 & \begin{matrix}0+\\180\end{matrix} & 0-90 & 0+180 & 0-90 \\ 0+0 & \begin{matrix}45+\\90\end{matrix} & \begin{matrix}90+\\0\end{matrix} & \begin{matrix}135+\\90\end{matrix} & \begin{matrix}180+\\0\end{matrix} & -135+90 & -90+0 & -45+90 & \begin{matrix}0+\\180\end{matrix} & \begin{matrix}45-\\90\end{matrix} & \begin{matrix}90+\\180\end{matrix} & 135-90 & \begin{matrix}180+\\180\end{matrix} & -135-90 & -90+180 & -45-90 \\ 0+0 & \begin{matrix}90+\\90\end{matrix} & \begin{matrix}180+\\0\end{matrix} & \begin{matrix}-90+\\90\end{matrix} & \begin{matrix}0+\\0\end{matrix} & 90+90 & -180+0 & -90+90 & \begin{matrix}0+\\180\end{matrix} & \begin{matrix}90-\\90\end{matrix} & \begin{matrix}180+\\180\end{matrix} & -90-90 & \begin{matrix}0+\\180\end{matrix} & 90-90 & -180+180 & -90-90 \\ 0+0 & \begin{matrix}135+\\90\end{matrix} & \begin{matrix}270+\\0\end{matrix} & \begin{matrix}45+\\90\end{matrix} & \begin{matrix}180+\\0\end{matrix} & -45+90 & -270+0 & -135+90 & \begin{matrix}0+\\180\end{matrix} & \begin{matrix}135-\\90\end{matrix} & \begin{matrix}270+\\180\end{matrix} & 45-90 & \begin{matrix}180+\\180\end{matrix} & -45-90 & -270+180 & -135-90 \end{bmatrix}$$

Thereby, a codebook with phase offset is obtained for the second antenna array:

$$\begin{bmatrix} 0 & 90 & 0 & 90 & 0 & 90 & 0 & 90 & 180 & -90 & 180 & -90 & 180 & -90 & 180 & -90 \\ 0 & 135 & 90 & 225 & 180 & -45 & -90 & 45 & 180 & -45 & 270 & 45 & 360 & -225 & 90 & -135 \\ 0 & 180 & 180 & 0 & 0 & 180 & -180 & 0 & 180 & 0 & 360 & -180 & 180 & 0 & 0 & -180 \\ 0 & 225 & 270 & 135 & 180 & 45 & -270 & -45 & 180 & 45 & 450 & -45 & 360 & -135 & -90 & -225 \end{bmatrix}$$

The above pre-coding matrices are equivalent to the followings:

$$\begin{bmatrix} 0 & 90 & 0 & 90 & 0 & 90 & 0 & 90 & 180 & -90 & 180 & -90 & 180 & -90 & 180 & -90 \\ 0 & 135 & 90 & -135 & 180 & -45 & -90 & 45 & 180 & -45 & 270 & 45 & 0 & 135 & 90 & -135 \\ 0 & 180 & 180 & 0 & 0 & 180 & -180 & 0 & 180 & 0 & 0 & 180 & 180 & 0 & 0 & -180 \\ 0 & -135 & 270 & 135 & 180 & 45 & -270 & -45 & 180 & 45 & 90 & -45 & 0 & -135 & -90 & 135 \end{bmatrix}$$

The same as the fifth embodiment, by combining the above two codebooks along the column direction, a four-bit codebook for the eight dual-polarized antennas can be obtained as follows.

$$\begin{bmatrix} 0 & 0 & 0 & 0 & 0 & 0 & 0 & 0 & 0 & 0 & 0 & 0 & 0 & 0 & 0 & 0 \\ 0 & 45 & 90 & 135 & 180 & -135 & -90 & -45 & 0 & 45 & 90 & 135 & 180 & -135 & -90 & -45 \\ 0 & 90 & 180 & -90 & 0 & 90 & -180 & -90 & 0 & 90 & 180 & -90 & 0 & 90 & -180 & -90 \\ 0 & 135 & 270 & 45 & 180 & -45 & -270 & -135 & 0 & 135 & 270 & 45 & 180 & -45 & -270 & -135 \\ 0 & 90 & 0 & 90 & 0 & 90 & 0 & 90 & 180 & -90 & 180 & -90 & 180 & -90 & 180 & -90 \\ 0 & 135 & 90 & -135 & 180 & -45 & -90 & 45 & 180 & -45 & 270 & 45 & 0 & 135 & 90 & -135 \\ 0 & 180 & 180 & 0 & 0 & 180 & -180 & 0 & 180 & 0 & 0 & 180 & 180 & 0 & 0 & -180 \\ 0 & -135 & 270 & 135 & 180 & 45 & -270 & -45 & 180 & 45 & 90 & -45 & 0 & -135 & -90 & 135 \end{bmatrix}$$

Since not only the phase offset of 180° but also the phase offsets of 90° and −90° can be fed back by employing the four-bit codebook, the precision of feedback is further improved.

Seventh Embodiment

In the present embodiment, a four-bit codebook is applied to the eight dual-polarized antennas as shown in FIG. 6, in which a Rel-8 four-antenna codebook is applied for the first antenna array, and a codebook with phase offset, which is generated according to the first embodiment of the present disclosure by using the Rel-8 four-antenna codebook as a basic codebook, is employed for the second antenna array. The Rel-8 four-antenna codebook and the codebook with phase offset generated from the Rel-8 four-antenna codebook have been explained in the second embodiment of the present disclosure, and unnecessary details thereof will not be given herein.

As in the fifth and the sixth embodiments, by combining the Rel-8 four-antenna codebook and the generated codebook with phase offset along the column direction, a four-bit codebook for eight dual-polarized antennas can be obtained.

The description of methods of generating codebook with phase offset has been made through multiple embodiments as above. In the following, a wireless communication system, base station and terminal using the generated codebook with phase offset to communicate will be described.

Figure 7:
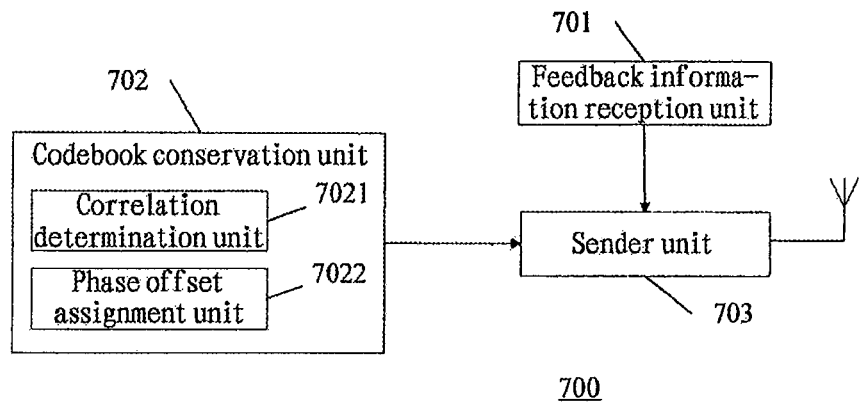
FIG. 7 shows a structural block diagram of a base station using a codebook generated according to the codebook generation method of the first embodiment of the present disclosure to perform communication.
Figure 8:
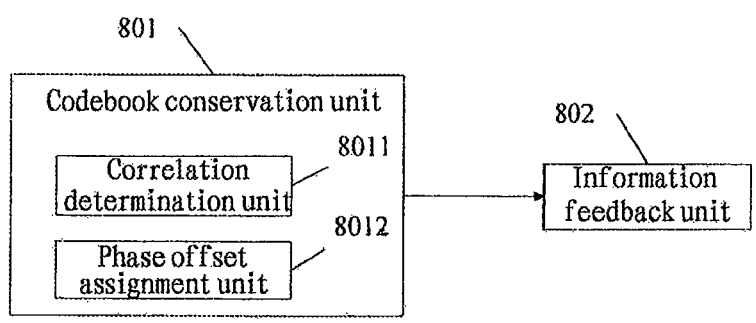
FIG. 8 shows a structural block diagram of a wireless terminal using a codebook generated according to the codebook generation method of the first embodiment of the present disclosure to perform communication.

As described above, multiple codebooks as mentioned above may be applied in the downlink CoMP environment as shown in FIG. 1. In a wireless communication system including multiple base stations and terminals as shown in FIG. 1, each of the multiple base stations is configured with one antenna array, and the multiple antenna arrays configured in the multiple base stations respectively correspond to multiple codebooks. FIG. 7 and FIG. 8 show structural diagrams of the base stations and the terminals respectively.

As shown in FIG. 7, any base station 700 of the multiple base stations includes: a feedback information reception unit 701 which receives information fed back from terminals; a codebook conservation unit 702 which forms a codebook with phase offset by assigning phase offsets to certain pre-coding matrices in a basic codebook, or stores the basic codebook and the codebook with phase offset formed by assigning phase offsets to certain pre-coding matrices in the basic codebook in advance; and a sender unit 703 which selects a corresponding pre-coding matrix from the basic codebook or the codebook with phase offset according to the information fed back from a terminal, uses the selected pre-coding matrix to pre-code data to be transmitted, and sends the pre-coded data to the terminal via the antenna array configured in the base station. The codebook conservation unit 702 may further includes: a correlation determination unit 7021 which determines the pre-coding matrix pairs having high correlations in the basic codebook; and a phase offset assignment unit 7022 which assigns a phase offset to two pre-coding matrices included in a pre-coding matrix pair according to the correlation between the two pre-coding matrices, such that the higher the correlation between the two pre-coding matrices is, the larger the assigned phase offset is.

It should be explained that although it is described here that the sender unit 703 selects a corresponding pre-coding matrix from the basic codebook or the codebook with phase offset according to the information fed back from a terminal, it is up to the base station if the actual downlink data transmission would follow terminal's suggestion. Specifically, the sender unit 703 may consider not only the feedback information, but also other factors well known for those skilled in the art such as feedback information from other terminals, background connection quality between the base stations, the degree of sharing schedule information between the base stations, and the like, to select a proper pre-coding matrix from the codebook. Therefore, the sender unit 703 is not limited to select the suggested pre-coding matrix from the basic codebook or the codebook with phase offset, instead, it may select other proper pre-coding matrices for downlink data transmission according to other factors well known for those skilled in the art.

As shown in FIG. 8, a terminal 800 includes: a codebook conservation unit 801 which forms a codebook with phase offset by assigning phase offsets to certain pre-coding matrices in a basic codebook, or stores the basic codebook and the codebook with phase offset formed by assigning phase offsets to certain pre-coding matrices in the basic codebook in advance; and a information feedback unit 802 which feeds back indexes for identifying pre-coding matrices in the basic codebook and the codebook with phase offset to respective antenna arrays of the base stations. The codebook conservation unit 801 may further include: a correlation determination unit 8011 which determines the pre-coding matrix pairs having high correlations in the basic codebook; and a phase offset assignment unit 8012 which assigns a phase offset to two pre-coding matrices included in a pre-coding matrix pair according to the correlation between the two pre-coding matrices, such that the higher the correlation between the two pre-coding matrices is, the larger the assigned phase offset is.

It is easy to understand that in a wireless communication system including the above base stations and terminals described with reference to FIG. 7 and FIG. 8, the proper codebooks may be applied for respective base stations according to the manners described in the second, third and fourth embodiments as above. Accordingly, a terminal will feed back indexes for identifying the pre-coding matrices according to the codebooks used by respective base stations.

The present disclosure may also be applied to the eight dual-polarized antennas as shown in FIG. 6. In a wireless communication system including the base stations and terminals configured with dual-polarized antennas, the base stations have structures similar with that as shown in FIG. 7. Specifically, the base station is configured with two antenna arrays formed as the dual-polarized antennas, and includes: a feedback information reception unit for receiving information fed back from terminals; a codebook conservation unit for forming a codebook with phase offset by assigning phase offsets to certain pre-coding matrices in a basic codebook, or for storing a codebook obtained by combining the basic codebook and the codebook with phase offset generated from the basic codebook in advance, in which the two antenna arrays in the dual-polarized antennas correspond to the basic codebook and the codebook with phase offset respectively; and a sender unit for selecting a corresponding pre-coding matrix from the codebook obtained by combining the basic codebook and the codebook with phase offset according to the information fed back from a terminal, using the selected pre-coding matrix to pre-code data to be transmitted, and sending the pre-coded data to the terminal via the antenna arrays. The codebook conservation unit may further include: a correlation determination unit for determining pre-coding matrix pairs having high correlations in the basic codebook; and a phase offset assignment unit for assigning a phase offset to two pre-coding matrices according to the correlation between the two pre-coding matrices, such that the higher the correlation between the two pre-coding matrices is, the larger the assigned phase offset is.

Also, although it is described herein that the sender unit selects a corresponding pre-coding matrix from the codebook obtained by combining the basic codebook and the codebook with phase offset according to the information fed back from a terminal, this is not limiting, instead, a proper pre-coding matrix can be selected according to other factors well known for those skilled in the art.

In the above wireless communication system including base stations and terminals configured with dual-polarized antennas, the structures of the terminals is the same as the structure shown in FIG. 8, thus unnecessary details thereof will not be given herein. It should be explained that, as mentioned in the fifth embodiment, the pre-coding matrix indexes for the two antenna arrays in the dual-polarized antennas are highly correlative, thus the pre-coding matrix index for the second antenna array is always the same as the pre-coding matrix index for the first antenna array. In such a case, the information feedback unit of the terminal may feed back only the index for the pre-coding matrix suggested to be used by the first antenna array, or only the index for the pre-coding matrix suggested to be employed by the second antenna array.

It is easy to understand that in a wireless communication system including base stations and terminals configured with dual-polarized antennas, the proper codebooks may be applied for antenna arrays in the base stations according to the manners described in the fifth, sixth and seventh embodiments as above. Accordingly, a terminal may feed back indexes for identifying the pre-coding matrices according to codebooks used by the antenna arrays in the base stations.

Eighth Embodiment

The codebook designs according to the foregoing embodiments efficiently improve the precision of feedback for a multi-antenna array, thus bringing a good throughput for a single user. In the present embodiment, a further description will be given about how to improve the data throughput in case of multiple user transmission, provided that the performance of single user is not decreased.

Figure 9:
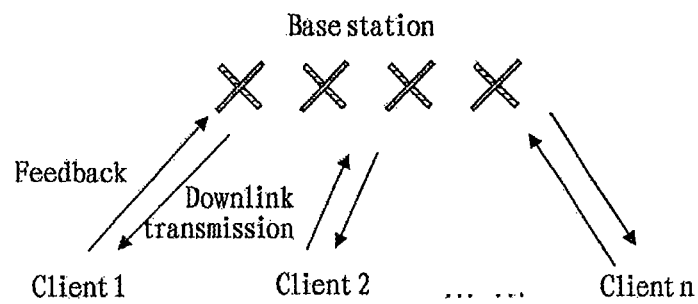
FIG. 9 shows an exemplary system of a multi-user transmission system.

FIG. 9 shows an exemplary systematical architecture of a multi-user transmission system.

FIG. 9 is a case in which a base station serves multiple clients at the same time. It should be explained herein that the base station in FIG. 9 is described as having a form of eight dual-polarized antennas, it is only exemplary, and the base station of the multi-user transmission system may be any other forms well known in the art. When different reporting manners are employed in the clients, the operation procedures of the multi-user transmission system are different either. The operation procedures of the multi-user transmission system in two cases are introduced below.

First of all, when the clients employ a reporting manner of PMI, the operation procedure of the system is usually as follows. First, the clients report their own PMIs to the base station (the clients assume that the base station employs single-user transmission). Then, the base station detects the PMIs of the multiple clients, and sends data of two clients on the same resource block if the PMIs reported by the two clients are orthogonal with each other, otherwise, the base station will not perform multi-user data transmission. Finally, the clients receive data from the base station and demodulate the received data without knowing whether there is a co-scheduled UE or not.

Further, in addition to the above reporting manner of PMI, the current standard may also employ a reporting manner of PMI+BCI (Best Companion PMI). The operation procedure of the system in such a case is as follows. First, in addition to the clients' own PMIs (clients assume that the base station employs single-user transmission), the clients further report the PMIs expected most to be used by a co-scheduled UE in a case of utilizing multi-user transmission, i.e., BCIs (in principle, the BCI should use the same codebook as the PMI), to the base station. Then, the base station detects the PMIs and BCIs of the multiple clients, and sends data of two clients on the same resource block if the BCI reported by one client is the same as the PMI reported by the other client, otherwise, the base station will not perform multi-user data transmission. Finally, the clients receive data from the base station and demodulate the received data without knowing whether there is a co-scheduled UE or not.

It can be seen, from the operation procedures of the multi-user transmission system in the above two cases, that the possibility of multi-user transmission is largely dependent on the orthogonal property between PMIs (or BCIs) reported by the multiple clients. In general, it is possible to perform multi-user transmission for multiple users only in a case that the PMIs (or BCIs) reported by the multiple clients are orthogonal with each other. Therefore, in order to improve performance of multi-user transmission, the orthogonal property between the pre-coding vectors (corresponding to the pre-coding matrices as mentioned in the above embodiments) included in a codebook should be sufficiently considered when a codebook is designed.

In the following, the orthogonal property between pre-coding vectors in a codebook is specifically analyzed by taking the eight dual-polarized antennas of the fifth embodiment and the sixth embodiment as an example.

First, for convenience of orthogonal property analysis, the pre-coding matrices in the DFT based three-bit four-antenna codebook represented in phase in the above fifth embodiment $$\begin{bmatrix} 0 & 0 & 0 & 0 & 0 & 0 & 0 & 0 \\ 0 & 45 & 90 & 135 & 180 & -135 & -90 & -45 \\ 0 & 90 & 180 & -90 & 0 & 90 & -180 & -90 \\ 0 & 135 & 270 & 45 & 180 & -45 & -270 & -135 \end{bmatrix}$$

are represented in a order of from left to right respectively as base vectors v0, v1, v2, v3, v4, v5, v6, v7, that is:

v0=[0 0 0 0]$^T$
v1=[0 45 90 135]$^T$
v2=[0 90 180 270]$^T$
v3=[0 135 −90 45]$^T$
v4=[0 180 0 180]$^T$
v5=[0 −135 90 −45]$^T$
v6=[0 −90 −180 −270]$^T$
v7=[0 −45 −90 −135]$^T$

Figure 10:
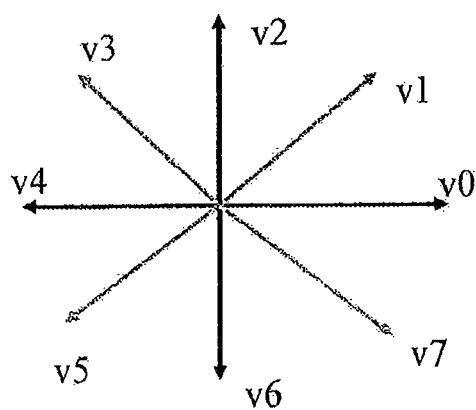
FIG. 10 shows the grouped orthogonal property of base vectors in a DFT based three-bit four-antenna codebook.

FIG. 10 shows the grouped orthogonal property of base vectors in a DFT based three-bit four-antenna codebook. As shown in FIG. 10, the respective base vectors as described above are grouped orthogonally, that is, the base vectors v0, v2, v4, v6 constitute an orthogonal basis, and the base vectors v1, v3, v5, v7 constitute another orthogonal basis. It should be noted that the mapping relationship between the respective base vectors v0, v1, v2, v3, v4, v5, v6, v7 and the vector graph of FIG. 10 is well known for those skilled in the art, and it will not be described in detail herein.

According to the above sixth embodiment, by combining the above DFT based three-bit four-antenna codebook in the row direction into a four-bit codebook, and by combining the obtained four-bit codebook and a codebook with phase offset generated from the obtained four-bit codebook in the column direction, a four-bit codebook for the eight dual-polarized antennas is obtained as follows:

$$\begin{bmatrix} 0 & 0 & 0 & 0 & 0 & 0 & 0 & 0 & 0 & 0 & 0 & 0 & 0 & 0 & 0 & 0 \\ 0 & 45 & 90 & 135 & 180 & -135 & -90 & -45 & 0 & 45 & 90 & 135 & 180 & -135 & -90 & -45 \\ 0 & 90 & 180 & -90 & 0 & 90 & -180 & -90 & 0 & 90 & 180 & -90 & 0 & 90 & -180 & -90 \\ 0 & 135 & 270 & 45 & 180 & -45 & -270 & -135 & 0 & 135 & 270 & 45 & 180 & -45 & -270 & -135 \\ 0 & 90 & 0 & 90 & 0 & 90 & 0 & 90 & 180 & -90 & 180 & -90 & 180 & -90 & 180 & -90 \\ 0 & 135 & 90 & -135 & 180 & -45 & -90 & 45 & 180 & -45 & 270 & 45 & 0 & 135 & 90 & -135 \\ 0 & 180 & 180 & 0 & 0 & 180 & -180 & 0 & 180 & 0 & 0 & 180 & 180 & 0 & 0 & -180 \\ 0 & -135 & 270 & 135 & 180 & 45 & -270 & -45 & 180 & 45 & 90 & -45 & 0 & -135 & -90 & 135 \end{bmatrix}$$

Here, each column in the four-bit codebook for eight dual-polarized antennas is referred to as a pre-coding vector (pre-coding matrix). According to the above definitions for the respective base vectors v0, v1, v2, v3, v4, v5, v6, v7, every pre-coding vector may be represented by the above base vectors. The base vectors in the basic codebook may also be referred to as the pre-coding vectors. Relationships between the indexes for pre-coding matrix and the pre-coding vectors represented by the above base vectors are shown in Table 1 below.

TABLE 1

| Pre-coding matrix indexes | Pre-coding vectors | Pre-coding matrix indexes | Pre-coding vectors |
|---|---|---|---|
| PMI0 | $[v0\ v0]^T$ | PMI8 | $[v0\ -v0]^T$ |
| PMI1 | $[v1\ jv1]^T$ | PMI9 | $[v1\ -jv1]^T$ |
| PMI2 | $[v2\ v2]^T$ | PMI10 | $[v2\ -v2]^T$ |
| PMI3 | $[v3\ jv3]^T$ | PMI11 | $[v3\ -jv3]^T$ |
| PMI4 | $[v4\ v4]^T$ | PMI12 | $[v4\ -v4]^T$ |
| PMI5 | $[v5\ jv5]^T$ | PMI13 | $[v5\ -jv5]^T$ |
| PMI6 | $[v6\ v6]^T$ | PMI14 | $[v6\ -v6]^T$ |
| PMI7 | $[v7\ jv7]^T$ | PMI15 | $[v7\ -jv7]^T$ |

The pre-coding matrix indexes PMI0, PMI1, . . . , PMI5 correspond to every column from left to right in the above four-bit codebook for the eight dual-polarized antennas respectively, that is, every pre-coding vectors from left to right. Coefficients 1, j, −1, −j correspond to the phase offset assignments of 0°, 90°, 180°, −90° respectively. With respect to the orthogonal property between the pre-coding vectors in the above four-bit codebook for the eight dual-polarized antennas, we take the pre-coding vector corresponding to the PMI0 in Table 1 as an example to analyze the orthogonal property.

Figure 11:
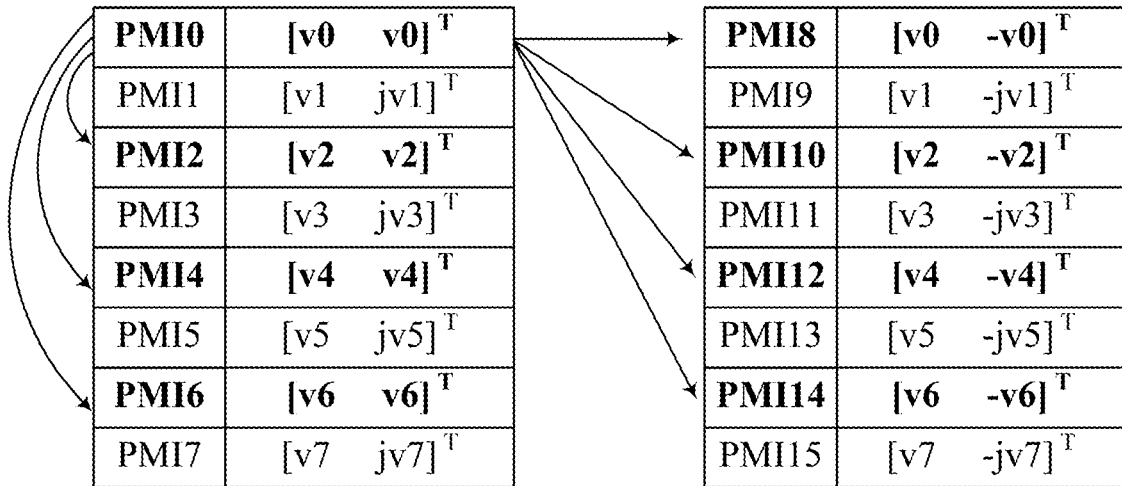
FIG. 11 shows the orthogonal property of the pre-coding vector corresponding to PMI0 in a four-bit codebook for eight dual-polarized antennas according to a sixth embodiment.

FIG. 11 shows the orthogonal property of the pre-coding vector corresponding to the PMI0 in the four-bit codebook for eight dual-polarized antennas according to the sixth embodiment.

It can be seen from FIG. 11 that the pre-coding vector corresponding to the PMI0 is orthogonal with the pre-coding vectors corresponding to seven PMIs in total of PMI2, PMI4, PMI6, PMI8, PMI10, PMI12 and PMI14 respectively. This is because, as describe above, the base vectors v0, v2, v4, v6 constitute a set of orthogonal bases with each other, the pre-coding vectors based on the base vectors v0, v2, v4, v6 are orthogonal with each other. For the same reason, eight pre-coding vectors based on the base vectors v1, v3, v5, v7, that is, pre-coding vectors corresponding to PMI1, PMI3, PMI5, PMI7, PMI9, PMI11, PMI13, PMI15 respectively, are orthogonal with each other. Therefore, in a case that the original codebook is used, the user using the base vector "v0(PMI0, PMI8)" is able to perform the multi-user transmission with only the users having the base vector "v2, v4 or v6(PMI2, PMI4, PMI6, PMI10, PMI12, PMI14)".

In addition, it can be noted from FIG. 10 that the angle differences between v0 and v2, v4, v6 are 90°, 180°, −90° respectively, while the angle differences between v0 and v1, v7 are 45°, −45° respectively. This means that the codebook design limits the scheduler of the base station, that is, it makes the scheduler perform the multi-user transmission with respect to only the multiple users with angle differences of a multiple of 90°, but not for the multiple users with angle differences of 45°.

Therefore, in order to improve the performance of multi-user transmission, the orthogonal property between the pre-coding vectors in the codebook should be further improved when the codebook is designed.

However, it should be noted herein that in the progress of the existing standardization, the single-user performance is generally of higher priority than the multi-user performance. Thus, the codebook design with respect to the multiple users should be made on the premise that the single-user performance is not degraded. Also, the single-user performance is mainly dependent on two aspects: (1) directionalities of the base vectors (eight vectors distributed uniformly in space); and (2) the precision of feedback for phase offset (two bits). Therefore, the codebook improvement for the multiple users should be made on the premise that the above two aspects are not influenced.

In the present embodiment, a new codebook is generated by designing a set of new base vectors v'0, v'1, v'2, v'3, v'4, v'5, v'6, v'7 satisfying the following attributes to replace v0, v1, v2, v3, v4, v5, v6, v7 respectively in the pre-coding vectors corresponding to the PMI0 to the PMI7, while keeping the pre-coding vectors corresponding to the PMI8 to the PMI15 unchanged:

(1) The directionalities of the major lobes of v'0, v'1, v'2, v'3, v'4, v'5, v'6, v'7 are the same as those of v0, v1, v2, v3, v4, v5, v6, v7 respectively;

(2) v'0, v'2, v'4, v'6 constitute a set of orthogonal bases of four dimensions, and v'1, v'3, v5, v'7 constitute another set of orthogonal bases of four dimensions;

(3) v'0, v'2, v'4, v'6 are orthogonal with at least one of v1, v3, v5, v7 respectively, and v'1, v'3, v'5, v'7 are orthogonal with at least one of v0, v2, v4, v6 respectively.

The new codebook thus generated can improve the performance of the multi-user transmission. Now, the pre-coding vector corresponding to the PMI0 is still taken as an example, and the orthogonal property after the above improvement is analyzed.

Figure 12:
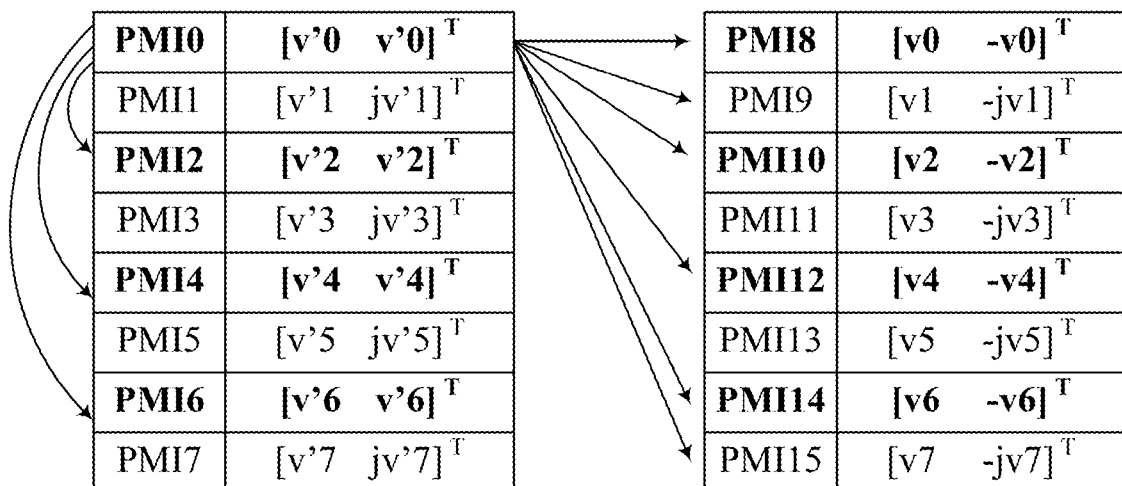
FIG. 12 shows the orthogonal property of the pre-coding vector corresponding to PMI0 in a four-bit codebook for eight dual-polarized antennas according to an eighth embodiment.

FIG. 12 shows the orthogonal property of the pre-coding vector corresponding to the PMI0 in the four-bit codebook for eight dual-polarized antennas according to the present embodiment.

It can be seen from FIG. 12 that the improved pre-coding vector $[v'0\ v'0]^T$ corresponding to the PMI0 are orthogonal with, in addition to the pre-coding vectors corresponding to the seven PMIs of PMI2, PMI4, PMI6, PMI8, PMI10, PMI12, PMI14 respectively, the pre-coding vectors corresponding to the PMI9 and PMI15. Thus, the scheduler of the base station is enabled to perform the multi-user transmission for not only the multiple users with angle differences of a multiple of 90° but also the multiple users with angle differences of 45°.

It should be explained that the example given by FIG. 12 is a case of v'0 being orthogonal with v1 and v7, which is only exemplary. The orthogonal property of the pre-coding vector corresponding to the PMI0 can be improved as long as v'0 is orthogonal with any one of v1, v3, v5, v7. The more vectors of v1, v3, v5, v7 with which v'0 is orthogonal, more highly the orthogonal property of the pre-coding vector corresponding to the PMI0 can be improved, that is, more highly the performance of the multi-user transmission can be improved.

The above new codebook not only improves the performance of the multi-user transmission, but also does not reduce the single-user performance. This is because the directionalities of newly designed base vectors v'0, v'1, v'2, v'3, v'4, v'5, v'6, v'7 are made to be consistent with those of v0, v1, v2, v3, v4, v5, v6, v7 respectively, that is, they are still eight vectors distributed uniformly in space, by satisfying the attribute (1). And, the phase offset assigned in the sixth embodiment is not changed, that is, the precision of phase offset is still two bits. Accordingly, the above two aspects which decide the single-user performance are both satisfied. Thus, the new codebook obtained in the present embodiment can improve the performance of the multi-user transmission on the premise that the single-user performance is not reduced.

More specifically, as an example, the present disclosure provides a method by which the above new base vectors v'0, v'1, v'2, v'3, v'4, v'5, v'6, v'7 can be efficiently obtained as follows:

At a first step, v'0 is generated, that is, a vector that can maximize the correlation with v0 is found among the vectors being orthogonal with at least one of v1, v3, v5, v7, and it is taken as v'0.

It can be known from the above description that there are two sets of base vectors (pre-coding matrices) such as the base vectors v0, v2, v4, v6 and the base vectors v1, v3, v5, v7 included in the basic codebook, and respective base vectors in each set of base vectors are orthogonal with each other. According to the present disclosure, it is to find out (compute) vectors that are orthogonal with at least one base vector in a set of base vectors v1, v3, v5, v7 (considered as the second set of base vectors here), and a vector whose correlation with one base vector (for example v0) of another set of base vectors v0, v2, v4, v6 (considered as the first set of base vectors here) is the highest among the acquired vectors is made to be a new base vector, such as v'0. According to the present embodiment, the acquirement of the vectors that are orthogonal with at least one pre-coding matrix of the second set of base vectors can be realized by computing a linear combination of at least two base vectors of the second set of base vectors, for example, computing the linear combination of v3 and v5.

At a second step, other new base vectors v'1, v'2, v'3, v'4, v'5, v'6, v'7 other than v'0 are generated one by one through the same operation as the first step. For example, if v'1 is to be generated, it is required to find out a vector that can maximize the correlation with v1 among the vectors being orthogonal with at least one of v2, v3, v6, v8, and take it as v'1. With respect to the other new base vectors v'2, v'3, v'4, v'5, v'6, v'7, the same operation is employed.

Additionally, after any one of v'0, v'1, v'2, v'3, v'4, v'5, v'6, v'7 is generated, the other new base vectors can be generated with a manner as follow. For example, after v'0 is generated, the other new base vectors v'1, v'2, v'3, v'4, v'5, v'6, v'7 can be obtained by the equation below, for example:

v'1 can be obtained via v'1=diag (v1)*v'0, i.e., $$v'1 = \begin{bmatrix} 1 & 0 & 0 & 0 \\ 0 & \dfrac{1+j}{\sqrt{2}} & 0 & 0 \\ 0 & 0 & j & 0 \\ 0 & 0 & 0 & \dfrac{-1+j}{\sqrt{2}} \end{bmatrix} \cdot v'0$$

Similarly, v'2, v'3, v'4, v'5, v'6, v'7 can be obtained respectively through the following equations:

v'2=diag (v2)*v'0

...

v'7=diag (v7)*v'0

That is to say, the other base vectors v1, v2, v3, v4, v5, v6, v7 other than the base vector v0 are further multiplied with the generated new base vector v'0 respectively, such that the other new base vectors v'1, v'2, v'3, v'4, v'5, v'6, v'7 are generated.

Subsequently, the original base vectors v0, v1, v2, v3, v4, v5, v6, v7 are respectively replaced with the new base vectors v'0, v'1, v'2, v'3, v'4, v'5, v'6, v'7, thus a new basic codebook is formed.

According to the present embodiment, the basic codebook [v0, v1, v2, v3, v4, v5, v6, v7] and the new codebook [v'0, v'1, v'2, v'3, v'4, v'5, v'6, v'7] are combined along the row direction to form an extended codebook, and a predetermined base vectors in the extended codebook are assigned phase offsets so that a codebook with phase offset is generated. Further, the extended codebook and the generated codebook with phase offsets are combined along the column direction into one codebook as the codebook for the eight dual-polarized antennas.

For further convenience of understanding, the design for v'0 in the first step is now illustrated. Here, it is assumed that $v0=[1\ 1\ 1\ 1]^T$, and it is to find out a vector which can maximize the correlation with $[1\ 1\ 1\ 1]^T$ among the vectors being orthogonal with v1 and v7, and take it as v'0. According to the present embodiment, the vectors being orthogonal with v1 and v7 may be linear combinations of v3 and v5. By performing a numerical value search, the following equation can be obtained.

$$v'0 = v3/\sqrt{2} + (0.5 + 0.5j)*v5$$

$$= \begin{bmatrix} 1.2071 + 0.5000i \\ -0.5000 - 0.2071i \\ -0.5000 - 0.2071i \\ 1.2071 + 0.5000i \end{bmatrix}$$

Ninth Embodiment

The codebook design in the eighth embodiment makes the scheduler of a base station be able to perform multi-user transmission for multiple users with angle differences of not only multiples of 90° but also 45°, thereby it improves the performance of multi-user transmission on the premise that the single-user performance is not degraded.

The same manner as that in the eighth embodiment above may be extended to a case in that the rank of a pre-coding matrix is 2, as described in the ninth embodiment.

The case of the rank 2 transmission has a similar nature with MU-MIMO transmission, i.e., signals in more than one layer are sent out from a base station, with the multi-user transmission in the eighth embodiment. Their difference resides in that the signals in two layers are sent to two users respectively in the multi-user transmission, while the signals in the two layers are sent to the same user in the case of the rank 2 transmission. Similar with the eighth embodiment, the emission directions of the signals in the two layers are v0 and v'0 respectively.

A basic form of a rank 2 pre-coding matrix for eight dual-polarized antennas is $$\begin{bmatrix} v_0 & v_0 \\ v_0 & -v_0 \end{bmatrix},$$

that is, the pre-coding matrix vector used by the signals in the first layer is $$\begin{bmatrix} v_0 \\ v_0 \end{bmatrix},$$

and the pre-coding matrix vector used by the signals in the second layer is $$\begin{bmatrix} v_0 \\ -v_0 \end{bmatrix}.$$

Wherein, $v_0$ is a DFT vector with the length of 4, and it corresponds to a angle of θ. The basic form represents that the transmission directions of the signals in the first layer and the second layer are identical, i.e., v0=v'0, and they have completely opposite phase offset. The opposite phase offset are mainly used to assure the orthogonal property between the precoding vectors of the two layers, which is an essential feature of rank 2 pre-coding matrix.

It is noted that in a practical environment, the best directions of the signals in the first layer and the second layer are not necessarily to be exactly the same, but they are possibly different. Therefore, if codebook includes certain pre-coding matrixes corresponding to the case that the directions of the signals in the first layer and the second layer are different, the throughput of the system can be improved.

In the eighth embodiment, the first step is as follows:

(1) the directions of major lobes of v'0, v'1, v'2, v'3, v'4, v'5, v'6, v'7 are the same as those of v0, v1, v2, v3, v4, v5, v6, v7 respectively;

The v'0, v'1, v'2, v'3, v'4, v'5, v'6, v'7 in the eighth embodiment represent pre-coding vectors used for the second user in MU-MIMO transmission, and they represent pre-coding vectors used by the signals in the second layer for the rank 2 case. In the basic form of rank 2, the directions of signals in the second layer have already been the same as those of signals in the first layer. The improvement of the present embodiment is to expect the directions of signals in the second layer and the first layer to be different, thus the first step of the ninth embodiment should be as follows:

(1) the directions of major lobes of v'0, v'1, v'2, v'3, v'4, v'5, v'6, v'7 are different with those of v0, v1, v2, v3, v4, v5, v6, v7 respectively;

The second step of the ninth embodiment is the same as that of the eighth embodiment:

(2) v'0, v'2, v'4, v'6 constitute a set of orthogonal bases in four dimensions, and v'1, v'3, v'5, v'7 constitute another set of orthogonal bases in four dimensions;

The third step of the ninth embodiment is also the same as that of the eighth embodiment:

(3) v'0, v'2, v'4, v'6 are orthogonal with at least one of v1, v3, v5, v7 respectively, and v'1, v'3, v'5, v'7 are orthogonal with at least one of v0, v2, v4, v6 respectively.

One special form of the third step is that v'0, v'2, v'4, v'6 are orthogonal with three of v1, v3, v5, v7 respectively. For instance, v'0 is orthogonal with v3, v5, v7, so that v'0=v1, similarly, v'2=v3, v'4=v5 and v'6=v7. In addition, v'1, v'3, v'5, v'7 are orthogonal with three of v0, v2, v4, v6 respectively, so that it can be obtained that v'1=v2, v'3=v4, v'5=v6 and v'7=v0. For convenience of reading, we summarize the relationship between v' and v as follows:

v'0=v1
v'1=v2
v'2=v3
v'3=v4
v'4=v5
v'5=v6
v'6=v7
v'7=v0

Thereby, we can deduce a rank 2 pre-coding matrix in accordance with the principle of the eighth embodiment. It is assumed that the basic pre-coding matrixes are in following forms:

$$PMI0: \begin{bmatrix} v0 & v0 \\ v0 & -v0 \end{bmatrix},$$

$$PMI1: \begin{bmatrix} v0 & v0 \\ jv0 & -jv0 \end{bmatrix},$$

$$PMI2: \begin{bmatrix} v2 & v2 \\ v2 & -v2 \end{bmatrix},$$

$$PMI3: \begin{bmatrix} v2 & v2 \\ jv2 & -jv2 \end{bmatrix},$$

-continued $$PMI4: \begin{bmatrix} v4 & v4 \\ v4 & -v4 \end{bmatrix},$$

$$PMI5: \begin{bmatrix} v4 & v4 \\ jv4 & -jv4 \end{bmatrix},$$

$$PMI6: \begin{bmatrix} v6 & v6 \\ v6 & -v6 \end{bmatrix},$$

$$PMI7: \begin{bmatrix} v6 & v6 \\ jv6 & -jv6 \end{bmatrix},$$

In such a case, according to the present disclosure, another set of pre-coding matrixes as shown in the following PMI8 to PMI15 can be designed based on respective pre-coding matrixes corresponding to PMI0 to PMI7 as described above.

$$PMI8: \begin{bmatrix} v0 & v1 \\ v0 & -v1 \end{bmatrix},$$

$$PMI9: \begin{bmatrix} v0 & v1 \\ jv0 & -jv1 \end{bmatrix},$$

$$PMI10: \begin{bmatrix} v2 & v3 \\ v2 & -v3 \end{bmatrix},$$

$$PMI11: \begin{bmatrix} v2 & v3 \\ jv2 & -jv3 \end{bmatrix},$$

$$PMI12: \begin{bmatrix} v4 & v5 \\ v4 & -v5 \end{bmatrix},$$

$$PMI13: \begin{bmatrix} v4 & v5 \\ jv4 & -jv5 \end{bmatrix},$$

$$PMI14: \begin{bmatrix} v6 & v7 \\ v6 & -v7 \end{bmatrix},$$

$$PMI15: \begin{bmatrix} v6 & v7 \\ jv6 & -jv7 \end{bmatrix}.$$

In the above eight pre-coding matrixes, the direction difference between the signals in the first layer and the signals in the second layer is 45°, where v0~v7 is defined as in the eighth embodiment.

In some cases, for rank one transmission, an angle difference of 45° between the basic pre-coding matrixes is too coarse, and a finer angle difference is preferred. For example, 22.5° or even 11.25° difference in direction is preferred. In the following text, we extend the above method to 11.25° direction difference.

The base vector in case of 11.25° difference can be written as:

w1=[0 11.25 22.5 33.75]
w2=[0 22.5 45 67.5]
w3=[0 33.75 67.5 101.25]
w4=[0 45 90 135]
w5=[0 56.25 112.5 168.75]
w6=[0 67.5 135 202.5]
w7=[0 78.75 157.5 236.25]
w8=[0 90 180 270]
w9=[0 101.25 202.5 303.75]
w10=[0 112.5 225 337.5]
w11=[0 123.75 247.5 11.25]
w12=[0 135 270 45]
w13=[0 146.25 292.5 78.75]
w14=[0 157.5 315 112.5]
w15=[0 168.75 337.5 146.25]
w16=[0 180 0 180]
w17=[0 191.25 22.5 213.75]
w18=[0 202.5 45 247.5]
w19=[0 213.75 67.5 281.25]
w20=[0 225 90 315]
w21=[0 236.25 112.5 348.75]
w22=[0 247.5 135 22.5]
w23=[0 258.75 157.5 56.25]
w24=[0 270 180 90]
w25=[0 281.25 202.5 123.75]
w26=[0 292.5 225 157.5]
w27=[0 303.75 247.5 191.25]
w28=[0 315 270 225]
w29=[0 326.25 292.5 258.75]
w30=[0 337.5 315 292.5]
w31=[0 348.75 337.5 326.25]

To emphasize that the new base vectors has better spatial granularity, we use "w" instead of "v" to represent those base vectors.

The above 32 base vectors include eight sets of orthogonal bases, in which the first set of orthogonal bases is [w0 w8 w16 w24], the second set of orthogonal bases is [w1 w9 w17 w25], the third set of orthogonal bases is [w2 w10 w18 w26], the fourth set of orthogonal bases is [w3 w11 w18 w27], and so on, thus all eight sets of orthogonal bases can be obtained.

As described in the above method, the form of the rank 2 pre-coding matrix to be designed is $$\begin{bmatrix} w_0 & w'_0 \\ w_0 & -w'_0 \end{bmatrix}.$$

According to the above steps, the first step of obtaining the rank 2 pre-coding matrix is that the direction of w'0 is different with that of w0, the second step is that [w'0, w'8, w'16, w'24] is one set of orthogonal bases, and the third step is that w'0 is orthogonal with three of w1~w31.

One example of the third step is that w'0 is orthogonal with w9, w17, w25. In this case, w'0=w1, and similarly it can be obtained w'1=w2, . . . , w'30=w31 and w'31=w0. In this case, the direction difference between the signals in the first layer and the signals in the second layer is 11.25°.

Another example of the third step is that w'0 is orthogonal with w10, w18, w26. In this case, w'0=w2, and similarly it can be obtained w'1=w3, . . . , w'29=w31, w'30=w0 and w'31=w1. In this case, the direction difference between the signals in the first layer and the signals in the second layer is 22.5°.

A third example of the third step is that w'0 is orthogonal with w11, w19, w27. In this case, w'0=w3, and similarly it can be obtained w'1=w4, . . . , w'28=w31, w'29=w0, w'30=w1 and w'31=w2. In this case, the direction difference between the signals in the first layer and the signals in the second layer is 33.75°.

An actual codebook may be a combination of the three examples of the third step as described above, that is, the direction differences between the signals in two layers for some rank 2 pre-coding matrixes are 11.25°, the direction differences for other some rank 2 pre-coding matrixes are 22.5°, and the direction differences for further some rank 2 pre-coding matrixes are 33.75°, and so on.

It can be summarized that the method of generating a codebook in a wireless communication system according to the ninth embodiment of the present disclosure may include: a setting step of setting a basic codebook including multiple base vectors grouped into multiple sets in each of which respective base vectors are orthogonal with each other; a computation step of computing a new base vector corresponding to one base vector in one set of the multiple sets of base vectors so that the new base vector equals to another base vector in other sets of base vectors other than the one set of base vectors, and repeating this computation step to acquire multiple new base vectors corresponding to the multiple base vectors; and a generation step of generating a new codebook using the respective new base vectors as described above.

In the above method, the plurality of base vectors in the basic codebook are $w_m$, which are DFT vectors, and differences between directions of base vectors $w_m$ and $w_{m+n}$ are n times of 11.25° in turn, where m and n are integer numbers, and they are also possible to be real numbers.

In the above method, the obtained new base vectors are $w'_m$. $w'_m$ is also DFT vectors but the directions of which are different from the corresponding base vectors $w_m$. Wherein $w'_m = w_{m+n}$, for example, it is possible to have $w'_m = w_{m+1}$, or $w'_m = w_{m+2}$, or $w'_m = w_{m+3}$, etc.

In the above method, the form of a rank 2 pre-coding vector in the new basic codebook is $$\begin{bmatrix} w_m & w'_m \\ w_m & -w'_m \end{bmatrix} \text{ and/or } \begin{bmatrix} w_m & w'_m \\ jw_m & -jw'_m \end{bmatrix},$$

wherein $$\begin{bmatrix} w_m \\ w_m \end{bmatrix} \text{ and } \begin{bmatrix} w'_m \\ -w'_m \end{bmatrix}$$

are used to precode the signals in different layers sent from a base station respectively, and $$\begin{bmatrix} w_m \\ jw_m \end{bmatrix} \text{ and } \begin{bmatrix} w'_m \\ -jw'_m \end{bmatrix}$$

are used to precode the signals in different layers sent from the base station respectively.

With the above embodiment of the present disclosure, the above pre-coding matrixes can be well adapted to realize the pre-coding with high performance, even if the directions of signals in the two layers emitted from a base station to a mobile terminal are different.

In the base station 700 and the terminal 800 as shown in FIG. 7 and FIG. 8, the method of generating a new codebook by newly designing base vectors to improve the orthogonal property between the pre-coding vectors in a codebook in the eighth and ninth embodiments can also be applied. For example, the codebook conservation units 702 and 801 in the base station 700 and the terminal 800 can newly design the base vectors.

For example, in the base station 700 according to the eighth embodiment, a basic codebook includes two sets of base vectors, and respective base vectors in each set of base vectors are orthogonal with each other. The codebook conservation unit 702 of the base station 700 acquires the vectors that are orthogonal with at least one base vector of the second set of base vectors, among the acquired vectors computes a vector whose correlation with one base vector of the first set of base vectors is the highest as a new base vector, generates other new base vectors similarly, and replaces respective original base vectors with respective new base vectors to form a new basic codebook.

According to the present embodiment, the codebook conservation unit 702 of the base station 700 generates other new base vectors from the other base vectors except for the one base vector in the first set of base vectors by repeating the operation of generating the new one base vector, or by multiplying the other base vectors except for the one base vector in the first set of base vectors with the new one base vector respectively.

According to the present embodiment, the codebook conservation unit 702 of the base station 700 computes linear combinations of at least two base vectors in the second set of base vectors as the vectors being orthogonal with at least one base vector of the second set of base vectors.

According to the present embodiment, the codebook conservation unit 702 of the base station 700 combines the original basic codebook and the new basic codebook in the row direction to form an extended codebook. The base station 700 further assigns the phase offsets to the base vectors in the extended codebook via the phase offset assignment unit 7022 so as to form a codebook with phase offset.

In a case of multiple antenna arrays applied to eight dual-polarized antennas (each of antenna arrays includes four antennas having the same polarization feature of the eight dual-polarized antennas), the codebook conservation unit 702 combines the extended codebook and the generated codebook with phase offset along the column direction into one codebook as the codebook for the eight dual-polarized antennas.

For example, in the base station 700 according to the ninth embodiment, a feedback information reception unit 701 receives information fed back from a terminal; a codebook conservation unit 702 stores a basic codebook and/or a new basic codebook, the basic codebook comprising a plurality of base vectors which are grouped into a plurality of sets, respective base vectors in each set of base vectors being orthogonal with each other, the new basic codebook being obtained in a way of: computating a new base vector corresponding to one base vector in one set of the plurality of sets of base vectors, so that the new base vector equals to another base vector in other sets of base vectors other than the one set of base vectors, and repeating the above operation to acquire a plurality of new base vectors corresponding to the plurality of base vectors, and generating the new basic codebook using the respective new base vectors; and a sender unit 703 pre-codes data to be transmitted by using the basic codebook and/or the new basic codebook based on the information fed back from the terminal, and sending the pre-coded data to the terminal via an antenna array.

According to the present embodiment, the plurality of base vectors in the basic codebook are $w_m$, which are DFT vectors, and differences between directions of base vectors $w_m$ and $w_{m+n}$ are n times of 11.25° in turn, where m and n are integer numbers, and they are also possible to be real numbers.

According to the present embodiment, the obtained new base vectors are $w'_m$. $w'_m$ is also DFT vectors, but the directions of which are different from the corresponding base vectors $w_m$. Wherein $w'_m=w_{m+n}$, for example, it is possible to have $w'_m=w_{m+1}$, or $w'_m=w_{m+2}$, or $w'_m=w_{m+3}$, etc.

According to the present embodiment, the form of a rank 2 pre-coding vector in the new basic codebook is $$\begin{bmatrix} w_m & w'_m \\ w_m & -w'_m \end{bmatrix} \text{ and/or } \begin{bmatrix} w_m & w'_m \\ jw_m & -jw'_m \end{bmatrix},$$

wherein $$\begin{bmatrix} w_m \\ w_m \end{bmatrix} \text{ and } \begin{bmatrix} w'_m \\ -w'_m \end{bmatrix}$$

are used to precode the signals in different layers sent from a base station respectively, and $$\begin{bmatrix} w_m \\ jw_m \end{bmatrix} \text{ and } \begin{bmatrix} w'_m \\ -jw'_m \end{bmatrix}$$

are used to precode the signals in different layers sent from the base station respectively.

For example, in the terminal 800 according to the eighth embodiment, a basic codebook includes two set of base vectors, and respective base vectors in each set of base vectors are orthogonal with each other. The codebook conservation unit 801 of the terminal 800 acquires the vectors that are orthogonal with at least one base vector of the second set of base vectors, among the acquired vectors computes a vector whose correlation with one base vector of the first set of base vectors is the highest as a new base vector, generates other new base vectors, and replaces respective original base vectors with respective new base vectors to form a new basic codebook.

According to the present embodiment, the codebook conservation unit 801 of the terminal 800 generates other new base vectors from the other base vectors except for the one base vector in the first set of base vectors by repeating the operation of generating the new one base vector, or by multiplying the other base vectors except for the one base vector in the first set of base vectors with the new one base vector respectively.

According to the present embodiment, the codebook conservation unit 801 of the terminal 800 computes linear combinations of at least two base vectors in the second set of base vectors as the vectors being orthogonal with at least one base vector of the second set of base vectors.

According to the present embodiment, the codebook conservation unit 801 of the terminal 800 combines the original basic codebook and the new basic codebook along the row direction to form an extended codebook. The terminal 800 further assigns phase offsets to the base vectors in the extended codebook via the phase offset assignment unit 8012 so as to form a codebook with phase offset.

In a case of multiple antenna arrays applied to eight dual-polarized antennas (each of antenna arrays includes four antennas having the same polarization feature of the eight dual-polarized antennas), the codebook conservation unit 801 combines the extended codebook and the generated codebook with phase offset along the column direction into one codebook as the codebook for the eight dual-polarized antennas.

For example, in the terminal 800 according to the ninth embodiment, a codebook conservation unit 801 stores a basic codebook and/or a new basic codebook, the basic codebook comprising a plurality of base vectors which are grouped into a plurality of sets, respective base vectors in each set of base vectors being orthogonal with each other, the new basic codebook being obtained in a way of: computating a new base vector corresponding to one base vector in one set of the plurality of sets of base vectors, so that the new base vector equals to another base vector in other sets of base vectors other than the one set of base vectors, and repeating the above operation to acquire a plurality of new base vectors corresponding to the plurality of base vectors, and generating the new basic codebook using the respective new base vectors; and a information feedback unit 802 feeds back indexes identifying pre-coding matrixes in the basic codebook and/or the new basic codebook to a base station.

According to the present embodiment, the plurality of base vectors in the basic codebook are $w_m$, which are DFT vectors, and differences between directions of base vectors $w_m$ and $w_{m+n}$ are n times of 11.25° in turn, where m and n are integer numbers, and they are also possible to be real numbers.

According to the present embodiment, the obtained new base vectors are $w'_m$. $w'_m$ is also DFT vectors, but the directions of which are different from the corresponding base vectors $w_m$. Wherein $w'_m=w_{m+n}$, for example, it is possible to have $w'_m=w_{m+1}$, or $w'_m=w_{m+2}$, or $w'_m=w_{m+3}$, etc.

According to the present embodiment, the form of a rank 2 pre-coding vector in the new basic codebook is $$\begin{bmatrix} w_m & w'_m \\ w_m & -w'_m \end{bmatrix} \text{ and/or } \begin{bmatrix} w_m & w'_m \\ jw_m & -jw'_m \end{bmatrix},$$

wherein $$\begin{bmatrix} w_m \\ w_m \end{bmatrix} \text{ and } \begin{bmatrix} w'_m \\ -w'_m \end{bmatrix}$$

are used to precode the signals in different layers sent from a base station respectively, and $$\begin{bmatrix} w_m \\ jw_m \end{bmatrix} \text{ and } \begin{bmatrix} w'_m \\ -jw'_m \end{bmatrix}$$

are used to precode the signals in different layers sent from the base station respectively.

Figure 13:
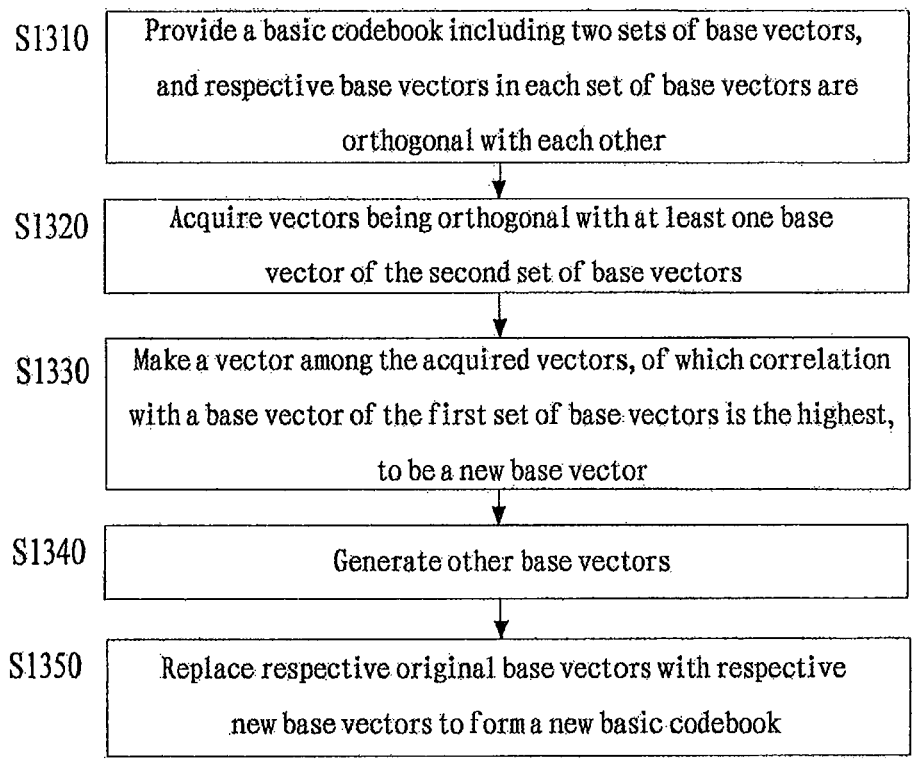
FIG. 13 is a flow chart of a method of generating codebook in a wireless communication system of multiple antenna arrays according to another embodiment of the present disclosure.

FIG. 13 is a flow chart showing a method of generating a codebook in a wireless communication system with the multiple antenna arrays according to the present embodiment.

As shown in FIG. 13, at step S1310, a basic codebook including two sets of base vectors in which respective base vectors in each set of base vectors are orthogonal with each other is provided. At step S1320, the vectors being orthogonal with at least one base vector of the second set of base vectors are acquired. At step S1330, a vector whose correlation with one base vector of the first set of base vectors is the highest among the acquired vectors is made to be a new base vector. At step S1340, other base vectors are generated.

At step S1350, respective original base vectors are replaced with respective new base vectors to form a new basic codebook.

According to the present embodiment, the step of generating the other new base vectors of the above method of generating codebook may include: repeating the operation of generating the new one base vector with respect to other base vectors other than the one base vector in the first set of base vectors, or multiplying the other base vectors other than the one base vector in the first set of base vectors with the new one base vector respectively.

According to the present embodiment, the step of acquiring the vectors being orthogonal with at least one base vector of the second set of base vectors of the above method of generating codebook may further include: computing linear combinations of at least two base vectors of the second set of base vectors.

According to the present embodiment, the above method of generating codebook may further include a step of combining the basic codebook and the new basic codebook along the row direction to form an extended codebook, and assigning phase offsets to the base vectors in the extended codebook to generate a codebook with phase offset.

According to the present embodiment, in the above method of generating codebook, the multiple antenna arrays may be eight dual-polarized antennas and each of antenna arrays includes four antennas having the same polarization feature of the eight dual-polarized antennas. The method may further include a step of combining the extended codebook and the generated codebook with phase offset along the column direction into one codebook as the codebook for the eight dual-polarized antennas.

The description of the eighth embodiment of the present disclosure is made as above. With the technical scheme of the present embodiment, the performance of the multi-user transmission can be improved without reducing the performance of the single-user transmission.

The respective embodiments of the present application as described above are only exemplary description, and their specific structures and operations are not limiting the scope of the present disclosure. Those skilled in the art may newly combine various parts and operations in the respective embodiments to produce new embodiments which also accord with the concept of the present disclosure.

The embodiments of the present disclosure may be implemented by hardware, software or firmware or in a way of combining them with each other, and the way of implementation is not limiting the scope of the present disclosure.

The connection relationships between respective functional elements (units) in the embodiments of the present disclosure are not limiting the scope of the present disclosure, in which one or more functional element(s) may include or be connected to any other functional elements.

Although some embodiments of the present disclosure have been shown and described in combination with the attached drawings, those skilled in the art should understand that variations and modifications can be made to these embodiments, which still fall within the claims and their equivalents of the disclosure, without departing from the principle and spirit of the disclosure.

The invention claimed is:

1. A communication apparatus comprising:
circuitry which, in operation, stores a plurality of extended precoding matrices; and
a transmitter which, in operation, transmits control information including a precoding matrix indicator (PMI) that identifies an extended precoding matrix selected from the plurality of extended precoding matrices;
wherein the extended precoding matrix is generated by combining a first precoding matrix ($w_m$) and a second precoding matrix, the first precoding matrix ($w_m$) including four elements having m times $2\pi/32$ of a phase difference between each element, and the second precoding matrix being generated by multiplexing the first precoding matrix with a phase offset, wherein m is an integer.

2. The communication apparatus according to claim 1, wherein phases of each element of the first precoding matrix ($w_m$) are 0, $2\pi/32 \times m$, $4\pi/32 \times m$ and $6\pi/32 \times m$.

3. The communication apparatus according to claim 1, wherein the first precoding matrix ($w_m$) is selected from 32 precoding matrices.

4. The communication apparatus according to claim 1, wherein the extended precoding matrix includes a matrix having a size of 1 by 8.

5. The communication apparatus according to claim 1, wherein the phase offset is selected from 0, $\pi/2$, $\pi$ and $3\pi/2$.

6. A communication method comprising:
storing a plurality of extended precoding matrices;
transmitting control information including a precoding matrix indicator (PMI) that identifies an extended precoding matrix selected from the plurality of extended precoding matrices;
wherein the extended precoding matrix is generated by combining a first precoding matrix ($w_m$) and a second precoding matrix, the first precoding matrix ($w_m$) including four elements having m times $2\pi/32$ of a phase difference between each element, and the second precoding matrix being generated by multiplexing the first precoding matrix with a phase offset, wherein m is an integer.

7. The communication method according to claim 6, wherein phases of each element of the first precoding matrix ($w_m$) are 0, $2\pi/32 \times m$, $4\pi/32 \times m$ and $6\pi/32 \times m$.

8. The communication method according to claim 6, wherein the first precoding matrix ($w_m$) is selected from 32 precoding matrixes.

9. The communication method according to claim 6, wherein the extended precoding matrix includes a matrix having a size of 1 by 8.

10. The communication method according to claim 6, wherein the phase offset is selected from 0, $\pi/2$, it and $3\pi/2$.

* * * * *